US009599835B2

(12) United States Patent
Lippey et al.

(10) Patent No.: US 9,599,835 B2
(45) Date of Patent: Mar. 21, 2017

(54) PROJECTION SYSTEMS WITH DESPECKLED LASER LIGHT

(71) Applicant: Laser Light Engines, Inc., Salem, NH (US)

(72) Inventors: Barret Lippey, Belmont, MA (US); John Arntsen, Manchester-by-the-Sea, MA (US); Len Hayes, Salem, NH (US)

(73) Assignee: Laser Light Engines, Inc., Salem, NH (US)

( * ) Notice: Subject to any disclaimer, the term of this patent is extended or adjusted under 35 U.S.C. 154(b) by 0 days.

(21) Appl. No.: 14/157,751

(22) Filed: Jan. 17, 2014

(65) Prior Publication Data
US 2014/0133024 A1 May 15, 2014

Related U.S. Application Data

(63) Continuation-in-part of application No. 12/962,185, filed on Dec. 7, 2010, now Pat. No. 8,786,940.

(51) Int. Cl.
| G02F 1/35 | (2006.01) |
| H01S 3/06 | (2006.01) |
| G02B 27/48 | (2006.01) |
| H01S 3/30 | (2006.01) |
| H04N 9/31 | (2006.01) |
| H01S 3/23 | (2006.01) |
| H01S 3/00 | (2006.01) |

(52) U.S. Cl.
CPC ........... *G02B 27/48* (2013.01); *G02F 1/3526* (2013.01); *G02F 1/3532* (2013.01); *H01S 3/2391* (2013.01); *H01S 3/302* (2013.01); *H04N 9/3161* (2013.01); *H01S 3/005* (2013.01); *H01S 2301/02* (2013.01)

(58) Field of Classification Search
None
See application file for complete search history.

(56) References Cited

U.S. PATENT DOCUMENTS

| 6,975,294 B2* | 12/2005 | Manni | G02B 27/48 345/32 |
| 2007/0291810 A1* | 12/2007 | Luo | H01S 3/0627 372/50.121 |
| 2008/0075130 A1* | 3/2008 | Mizuuchi | H04N 9/3129 372/6 |
| 2008/0151193 A1* | 6/2008 | Reder | H04N 13/0431 353/7 |
| 2008/0239171 A1* | 10/2008 | Inoue | H04N 9/3111 348/744 |
| 2009/0085912 A1* | 4/2009 | Scott | H04N 13/0033 345/419 |
| 2014/0071406 A1* | 3/2014 | Manni | G02B 27/48 353/31 |
| 2014/0104578 A1* | 4/2014 | Madamopoulos | G03B 21/2033 353/20 |

* cited by examiner

*Primary Examiner* — Hemang Sanghavi
(74) *Attorney, Agent, or Firm* — GTC Law Group PC & Affiliates

(57) ABSTRACT

An apparatus and method for the projection of stereoscopic images that includes a pulsed laser that generates green light and an optical fiber that generates stimulated Raman scattered light. The stimulated Raman scattering light is divided into green light and red light and the colors are used to form stereoscopic images. Additional lasers may be added to meet specific primary color targets and to balance the brightness of the images for each eye.

24 Claims, 21 Drawing Sheets

Speckle contrast (%) and white-balanced luminous efficacy (lm/W) vs. color (GR %)

PROJECTION SYSTEMS WITH DESPECKLED LASER LIGHT

BACKGROUND OF THE INVENTION

There are many advantages for using laser light sources to illuminate digital projection systems, but the high coherence of laser light tends to produce undesirable speckle in the viewed image. Known despeckling methods generally fall into the categories of polarization diversity, angle diversion, and wavelength diversity. In the laser projection industry, there has been a long-felt need for more effective despeckling methods.

SUMMARY OF THE INVENTION

In general, in one aspect, an optical apparatus that includes a pulsed laser that generates green light and an optical fiber. The green light is focused into the optical fiber and the optical fiber generates stimulated Raman scattering light that enhances an aspect of the light output. The light output is separated into green light and red light. The green and red light are used to form primaries of a stereoscopic image.

Implementations may include one or more of the following features. The aspect of the light output may be the color or the speckle. There may also be a red laser diode assembly that generates red light to form a second red primary of the stereoscopic image. The red light may have a wavelength between 650 and 680 nm. The starting green light may have a wavelength between 510 and 540 nm. The pulsed laser may include a master-oscillator power-amplifier fiber-laser system. There may also be a second pulsed laser and a second optical fiber. The second green laser light may be focused into the second optical fiber and the second optical fiber may generate a second stimulated Raman scattering light that enhances an aspect of the light output. The light output from the second optical fiber may also be used to form the green primary of the stereoscopic image. The starting wavelength of the second pulsed laser may be between 510 and 540 nm. The starting wavelength of the second pulsed laser may match the wavelength of the stimulated Raman scattering light from the first pulsed laser. There may also be a green laser diode assembly and that light may also be used to form the green primary of the stereoscopic image. The green laser diode assembly may have wavelengths in the range of 510 to 540 nm.

In general, in one aspect, an image projection method that includes generating green light from a pulsed laser, focusing the green light into an optical fiber, generating stimulated Raman scattering light that enhances an aspect of the light output, separating into green light and red light, and using the green light and red light to form primaries of a stereoscopic image.

Implementations may include one or more of the following features. The aspect of the light output may be the color or the speckle. There may also be a step of generating red light from a red laser diode and forming a second red primary of the stereoscopic image. The red diode laser light may have a wavelength between 650 and 680 nm. The pulsed green laser light may have a wavelength between 510 and 540 nm. The pulsed laser may include a master-oscillator power-amplifier fiber-laser system. There may also be a second pulsed green laser generating light, focusing into a second optical fiber, and generating a second stimulated Raman scattering light which may enhance the light output. This light may also help form the green primary of the stereoscopic image and may have wavelengths between 510 and 540 nm. There may also be a green laser diode assembly generating green light that is used to help form the green primary of the stereoscopic image, and it may have wavelengths between 510 and 540 nm.

DETAILED DESCRIPTION

Figure 1:
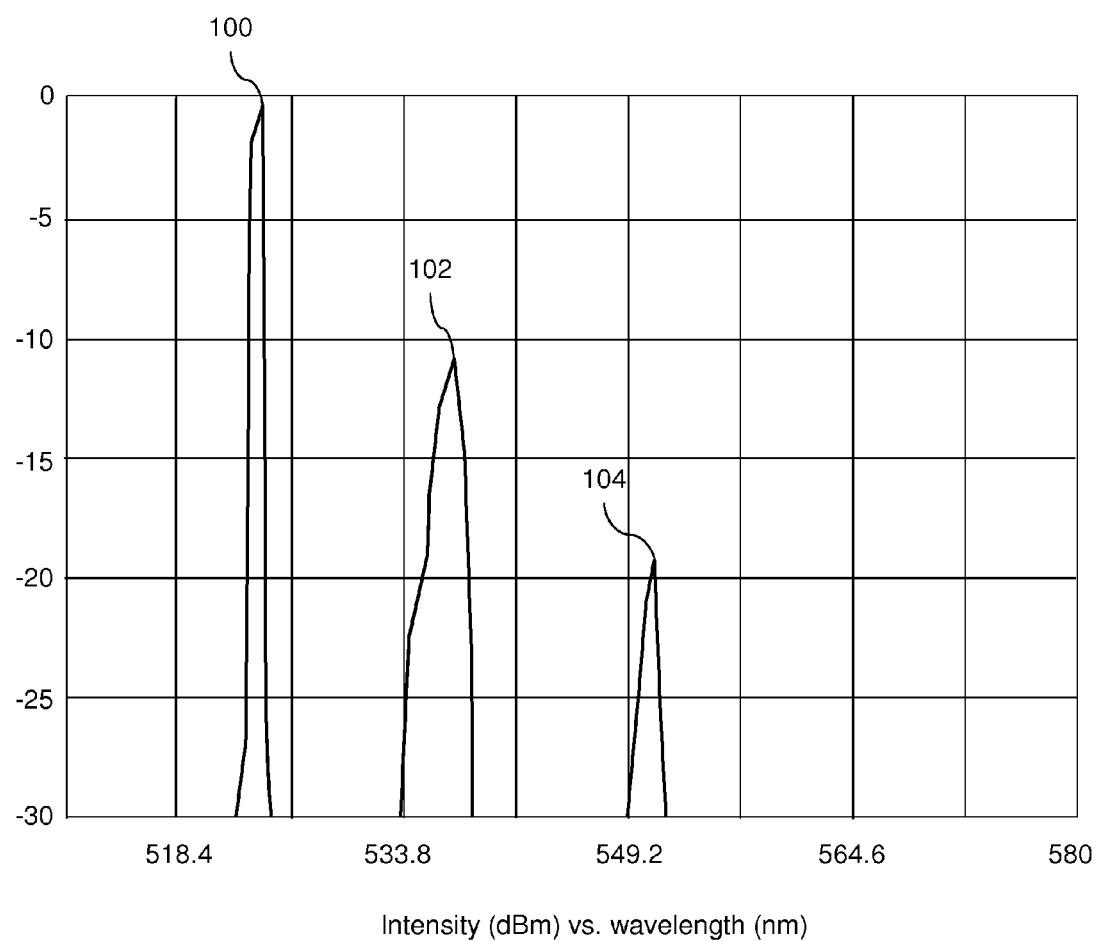
FIG. 1 is a graph of stimulated Raman scattering at moderate power.

Raman gas cells using stimulated Raman scattering (SRS) have been used to despeckle light for the projection of images as described in U.S. Pat. No. 5,274,494. SRS is a non-linear optical effect where photons are scattered by molecules to become lower frequency photons. A thorough explanation of SRS is found in Nonlinear Fiber Optics by Govind Agrawal, Academic Press, Third Edition, pages 298-354. FIG. 1 shows a graph of stimulated Raman scattering output from an optical fiber at a moderate power which is only slightly above the threshold to produce SRS. The x-axis represents wavelength in nanometers (nm) and the y-axis represents intensity on a logarithmic scale in dBm normalized to the highest peak. First peak 100 at 523.5 nm is light which is not Raman scattered. The spectral bandwidth of first peak 100 is approximately 0.1 nm although the resolution of the spectral measurement is 1 nm, so the width of first peak 100 cannot be resolved in FIG. 1. Second peak 102 at 536.5 nm is a peak shifted by SRS. Note the lower intensity of second peak 102 as compared to first peak 100. Second peak 102 also has a much larger bandwidth than first peak 100. The full-width half-maximum (FWHM) bandwidth of second peak 102 is approximately 2 nm as measured at points which are −3 dBm down from the maximum value. This represents a spectral broadening of approximately 20 times compared to first peak 100. Third peak 104 at 550 nm is still lower intensity than second peak 102. Peaks beyond third peak 104 are not seen at this level of power.

Nonlinear phenomenon in optical fibers can include self-phase modulation, stimulated Brillouin Scattering (SBS), four wave mixing, and SRS. The prediction of which nonlinear effects occur in a specific fiber with a specific laser is complicated and not amenable to mathematical modeling, especially for multimode fibers. SBS is usually predicted to start at a much lower threshold than SRS and significant SBS reflection will prevent the formation of SRS. One possible mechanism that can allow SRS to dominate rather than other nonlinear effects, is that the mode structure of a pulsed laser may form a large number closely-spaced peaks where each peak does not have enough optical power to cause SBS.

Figure 2:
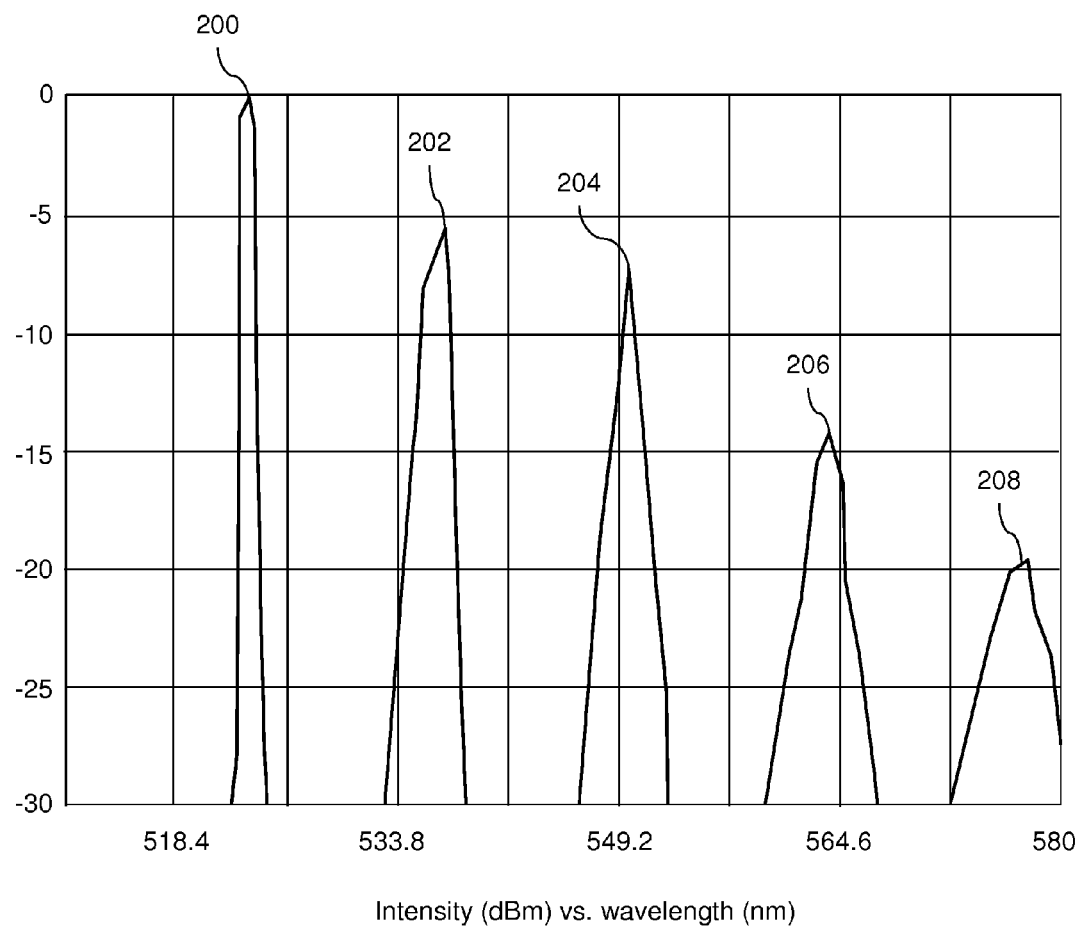
FIG. 2 is a graph of stimulated Raman scattering at high power.

FIG. 2 shows a graph of stimulated Raman scattering at higher power than in FIG. 1. The x-axis represents wavelength in nanometers and the y-axis represents intensity on a logarithmic scale in dBm normalized to the highest peak. First peak 200 at 523.5 nm is light which is not Raman scattered. Second peak 202 at 536.5 nm is a peak shifted by SRS. Note the lower intensity of second peak 202 as compared to first peak 200. Third peak 204 at 550 nm is still lower intensity than second peak 202. Fourth peak 206 at 564 nm is lower than third peak 204, and fifth peak 208 at 578 nm is lower than fourth peak 206. At the higher power of FIG. 2, more power is shifted into the SRS peaks than in the moderate power of FIG. 1. In general, as more power is put into the first peak, more SRS peaks will appear and more power will be shifted into the SRS peaks. In the example of FIGS. 1 and 2, the spacing between the SRS peaks is approximately 13 to 14 nm. As can be seen in FIGS. 1 and 2, SRS produces light over continuous bands of wavelengths which are capable of despeckling by the mechanism of wavelength diversity. Strong despeckling can occur to the point where the output from an optical fiber with SRS shows no visible speckle under most viewing circumstances. Maximum and minimum points for speckle patterns are a function of wavelength, so averaging over more wavelengths reduces speckle. A detailed description of speckle reduction methods can be found in Speckle Phenomena in Optics, by Joseph W. Goodman, Roberts and Company Publishers, 2007, pages 141-186.

Figure 3:
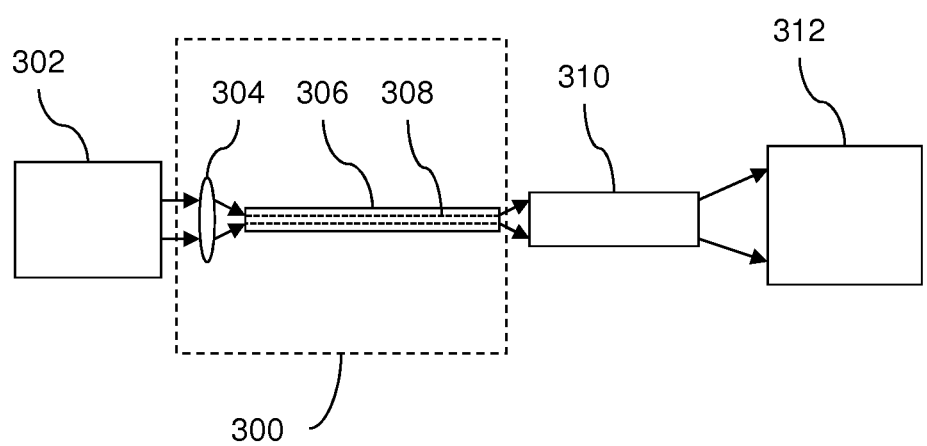
FIG. 3 is a top view of a laser projection system with a despeckling apparatus.

FIG. 3 shows a top view of a laser projection system with a despeckling apparatus based on SRS in an optical fiber. Laser light source 302 illuminates light coupling system 304. Light coupling system 304 illuminates optical fiber 306 which has core 308. Optical fiber 306 illuminates homogenizing device 310. Homogenizing device 310 illuminates digital projector 312. Illuminating means making, passing, or guiding light so that the part which is illuminated utilizes light from the part which illuminates. There may be additional elements not shown in FIG. 3 which are between the parts illuminating and the parts being illuminated. Light coupling system 304 and optical fiber 306 with core 308 form despeckling apparatus 300. Laser light source 302 may be a pulsed laser that has high enough peak power to produce SRS in optical fiber 306. Light coupling system 304 may be one lens, a sequence of lenses, or other optical components designed to focus light into core 308. Optical fiber 306 may be an optical fiber with a core size and length selected to produce the desired amount of SRS. Homogenizing device 310 may be a mixing rod, fly's eye lens, diffuser, or other optical component that improves the spatial uniformity of the light beam. Digital projector 312 may be a projector based on digital micromirror (DMD), liquid crystal device (LCD), liquid crystal on silicon (LCOS), or other digital light valves. Additional elements may be included to further guide or despeckle the light such as additional lenses, diffusers, vibrators, or optical fibers.

For standard fused-silica fiber with a numerical aperture of 0.22, the core size may be 40 micrometers diameter and the length may be 110 meters when the average input power is 3 watts at 523.5 nm. For higher or lower input powers, the length and/or core size may be adjusted appropriately. For example, at higher power, the core size may be increased or the length may be decreased to produce the same amount of SRS as in the 3 watt example. FIG. 1 shows the spectral output of a standard fused-silica fiber with a numerical aperture of 0.22, core size of 40 micrometers diameter and length of 110 meters when the average input power is 2 watts at 523.5 nm. FIG. 2 shows the output of the same system when the average input power is 4 watts. In both cases, the pulsed laser is a Q-switched, frequency-doubled neodymium-doped yttrium lithium fluoride (Nd:YLF) laser which is coupled into the optical fiber with a single aspheric lens that has a focal length of 18.4 mm. Alternatively, a frequency-doubled neodymium-doped yttrium aluminum garnet (Nd:YAG) laser may be used which has an optical output wavelength of 532 nm. The examples of average input powers in this specification are referenced to laser pulses with a pulse width of 50 ns and a frequency of 16.7 kHz.

Figure 4:
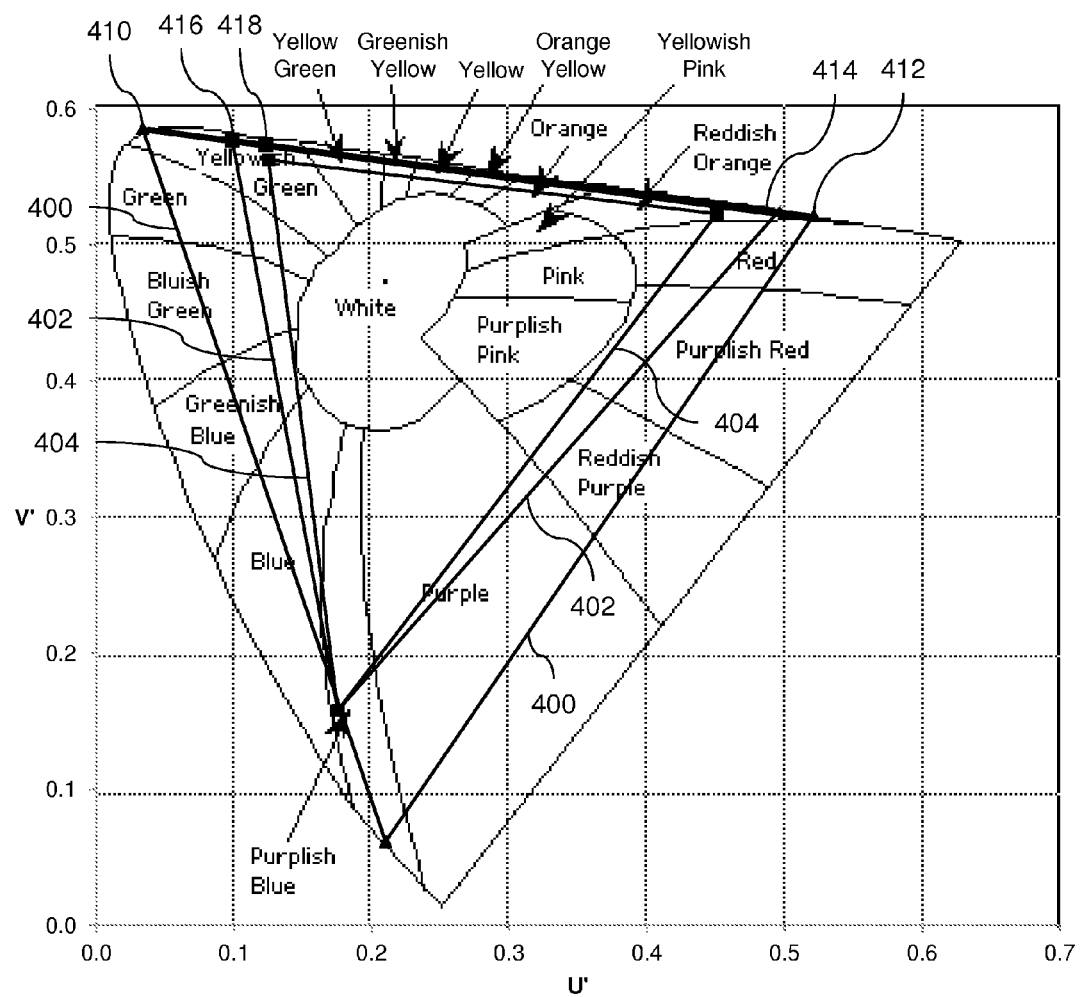
FIG. 4 is a color chart of a laser-projector color gamut compared to the Digital Cinema Initiative (DCI) and Rec. 709 standards.

FIG. 4 shows a color chart of a laser-projector color gamut compared to the DCI and Rec. 709 standards. The x and y axes of FIG. 4 represent the u' and v' coordinates of the Commission Internationale de l'Eclairage (CIE) 1976 color space. Each color gamut is shown as a triangle formed by red, green, and blue primary colors that form the corners of the triangle. Other colors of a digital projector are made by mixing various amounts of the three primaries to form the colors inside the gamut triangle. First triangle 400 shows the color gamut of a laser projector with primary colors at 452 nm, 523.5 nm, and 621 nm. Second triangle 402 shows the color gamut of the DCI standard which is commonly accepted for digital cinema in large venues such as movie theaters. Third triangle 404 shows the color gamut of The International Telecommunication Union Radiocommunication (ITU-R) Recommendation 709 (Rec. 709) standard which is commonly accepted for broadcast of high-definition television. Green point 410 is the green primary of a laser projector at 523.5 nm. Red point 412 is the red primary of a laser projector at 621 nm. Line 414 (shown in bold) represents the possible range of colors along the continuum between green point 410 and red point 412. The colors along line 414 can be are obtained by mixing yellow, orange, and red colors with the primary green color. The more yellow, orange, or red color, the more the color of the green is pulled along line 414 towards the red direction. For the purposes of this specification, "GR color" is defined to be the position along line 414 in percent. For example, pure green at green point 410 has a GR (green-red) color of 0%. Pure red at red point 412 has a GR color of 100%. DCI green point 416 is at u'=0.099 and v'=0.578 and has a GR color of 13.4% which means that the distance between green point 410 and DCI green point 416 is 13.4% of the distance between green point 410 and red point 412. When the Rec. 709 green point of third triangle 404 is extrapolated to line 414, the resultant Rec. 709 green point 418 has a GR color of 18.1%. The concept of GR color is a way to reduce two-dimensional u' v' color as shown in the two-dimensional graph of FIG. 4 to one-dimensional color along line 414 so that other variables can be easily plotted in two dimensions as a function of GR color. In the case of a primary green at 523.5 nm experiencing SRS, the original green color is partially converted to yellow, orange, and red colors, which pull the resultant combination color along line 414 and increase the GR %. Although the DCI green point may be the desired target for the green primary, some variation in the color may be allowable. For example, a variation of approximately +/−0.01 in the u' and v' values may be acceptable.

Figure 5:
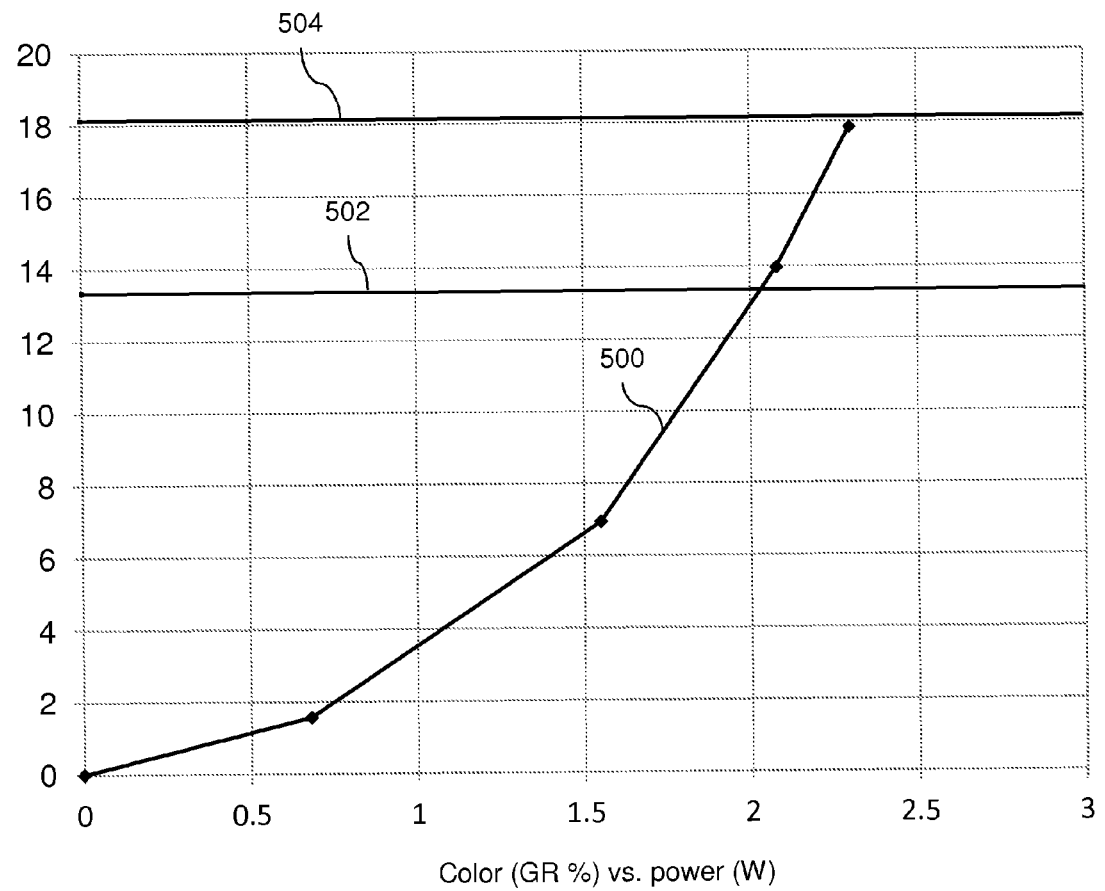
FIG. 5 is a graph of color vs. power for a despeckling apparatus.

FIG. 5 shows a graph of color vs. power for a despeckling apparatus. The x-axis represents power in watts which is output from the optical fiber of a despeckling apparatus such as the one shown in FIG. 3. The y-axis represents the GR color in percent as explained in FIG. 4. The optical fiber has the same parameters as in the previous example (core diameter of 40 micrometers and length of 110 meters). Curve 500 shows how the color varies as a function of the output power. As the output power increases, the GR color gradually increases. The curve can be fit by the third-order polynomial $$GR\% = 1.11p^3 + 0.0787p^2 + 1.71p + 0.0041$$

where "p" is the output power in watts. First line 502 represents the DCI green point at a GR color of 13.4%, and second line 504 represents the Rec. 709 green point at approximately 18.1%. The average power output required to reach the DCI green point is approximately 2.1 W, and the average output power required to reach the Rec. 709 point is approximately 2.3 W.

Figure 6:
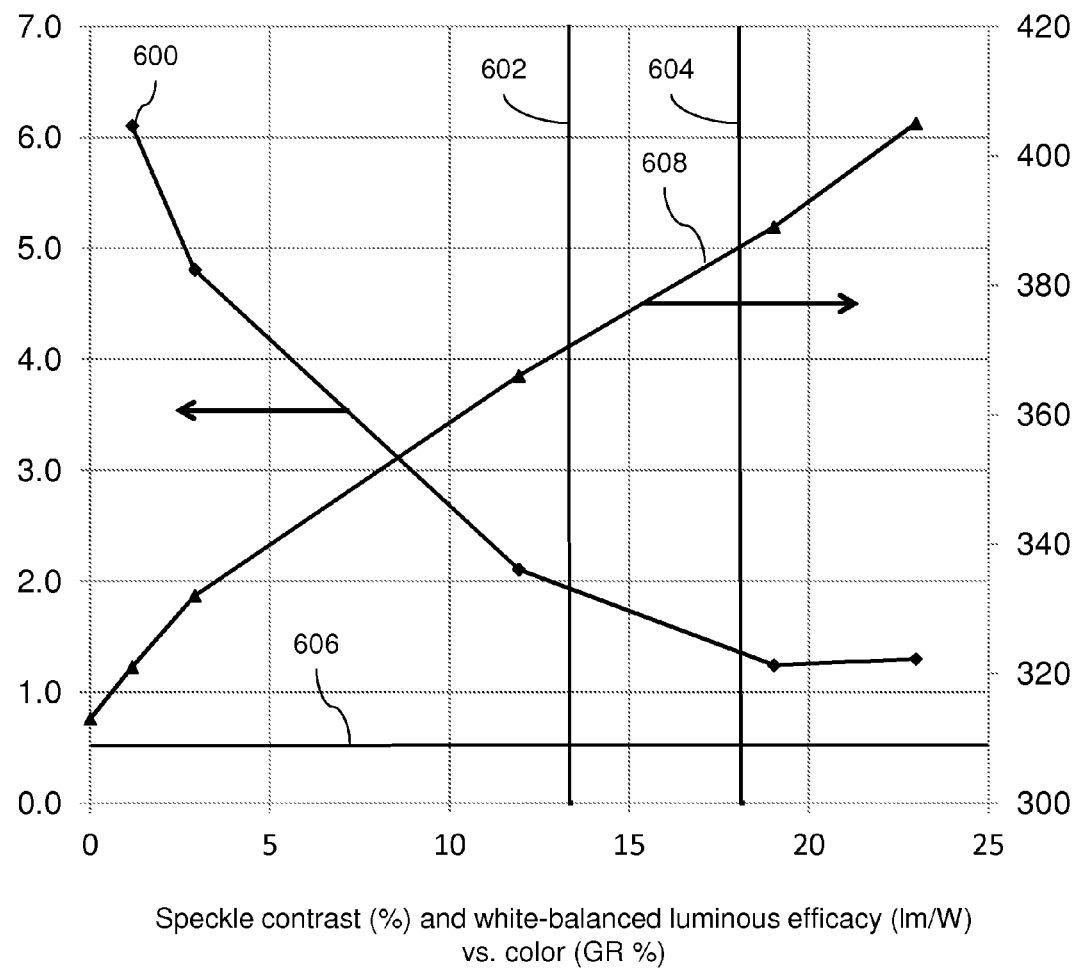
FIG. 6 is a graph of speckle contrast and luminous efficacy vs. color for a despeckling apparatus.

FIG. 6 shows a graph of speckle contrast and luminous efficacy vs. color for a despeckling apparatus such as the one shown in FIG. 3. The x-axis represents GR color in percent. The left y-axis represents speckle contrast in percent, and the right y-axis represents luminous efficacy in lumens per watt. Speckle contrast is a speckle characteristic that quantitatively represents the amount of speckle in an observed image. Speckle contrast is defined as the standard deviation of pixel intensities divided by the mean of pixel intensities for a specific image. Intensity variations due to other factors such as non-uniform illumination or dark lines between pixels (screen door effect) must be eliminated so that only speckle is producing the differences in pixel intensities. Measured speckle contrast is also dependent on the measurement geometry and equipment, so these should be standardized when comparing measurements. Other speckle characteristics may be mathematically defined in order to represent other features of speckle. In the example of FIG. 6, the measurement of speckle contrast was performed by analyzing the pixel intensities of images taken with a Canon EOS Digital Rebel XTi camera at distance of two screen heights. Automatic shutter speed was used and the iris was fixed at a 3 mm diameter by using a lens focal length of 30 mm and an f# of 9.0. Additional measurement parameters included an ISO of 100, monochrome data recording, and manual focus. The projector was a Digital Projection Titan that was illuminated with green laser light from a Q-switched, frequency-doubled, Nd:YLF laser which is coupled into a 40-micrometer core, 110 meter, optical fiber with a single aspheric lens that has a focal length of 18.4 mm. Improved uniformity and a small amount of despeckling was provided by a rotating diffuser at the input to the projector.

For the speckle-contrast measurement parameters described above, 1% speckle is almost invisible to the un-trained observer with normal visual acuity when viewing a 100% full-intensity test pattern. Conventional low-gain screens have sparkle or other non-uniformities that can be in the range of 0.1% to 1% when viewed with non-laser projectors. For the purposes of this specification, 1% speckle contrast is taken to be the point where no speckle is observable for most observers under most viewing conditions. 5% speckle contrast is usually quite noticeable to un-trained observes in still images, but is often not visible in moving images.

First curve 600 in FIG. 6 shows the relationship between measured speckle contrast and GR color. As the GR color is increased, the speckle contrast is decreased. Excellent despeckling can be obtained such that the speckle contrast is driven down to the region of no visible speckle near 1%. In the example of FIG. 6, first line 602 represents the DCI green point which has a speckle contrast of approximately 2% and second line 604 represents the Rec. 709 green point which has a speckle contrast of approximately 1%. The speckle contrast obtained in a specific configuration will be a function of many variables including the projector type, laser type, fiber type, diffuser type, and speckle-contrast measurement equipment. Third line 606 represents the minimum measurable speckle contrast for the system. The minimum measurable speckle contrast was determined by illuminating the screen with a broadband white light source and is equal to approximately 0.3% in this example. The minimum measurable speckle contrast is generally determined by factors such as screen non-uniformities (i.e. sparkle) and camera limitations (i.e. noise).

Second curve 608 in FIG. 6 shows the relationship between white-balanced luminous efficacy and GR color. The white-balanced luminous efficacy can be calculated from the spectral response of the human eye and includes the correct amounts of red light at 621 nm and blue light at 452 nm to reach the D63 white point. As the GR color is increased in the range covered by FIG. 6 (0% to 25%) the white-balanced luminous efficacy increases almost linearly from approximately 315 lm/w at a GR color of 0% to approximately 370 lm/w at the DCI green and approximately 385 lm/w at the Rec. 709 green point. This increase in luminous efficacy is beneficial to improve the visible brightness and helps compensate for losses that are incurred by adding the despeckling apparatus.

Figure 7:
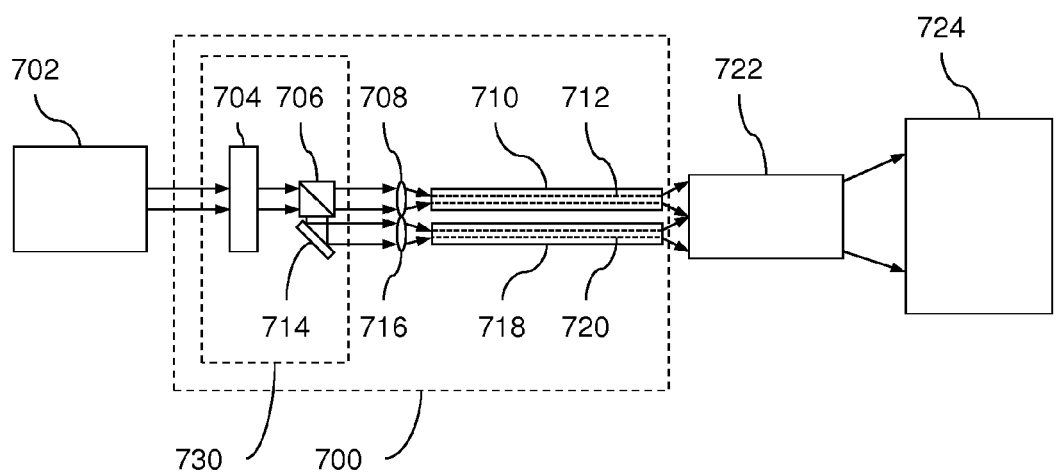
FIG. 7 is a top view of a laser projection system with an adjustable despeckling apparatus.

FIG. 7 shows a top view of a laser projection system with an adjustable despeckling apparatus. FIG. 7 incorporates two fibers for despeckling rather than the one fiber used for despeckling in FIG. 3. The despeckling apparatus of FIG. 3 allows tuning of the desired amount of despeckling and color point by varying the optical power coupled into optical fiber 306. FIG. 7 introduces a new independent variable which is the fraction of optical power coupled into one of the fibers. The balance of the power is coupled into the other fiber. The total power sent through the despeckling apparatus is the sum of the power in each fiber. The additional variable allows the despeckling and color point to be tuned to a single desired operation point for any optical power over a limited range of adjustment.

In FIG. 7, polarized laser light source 702 illuminates rotating waveplate 704. Rotating waveplate 704 changes the polarization vector of the light so that it contains a desired amount of light in each of two polarization states. Rotating waveplate 704 illuminates polarizing beamsplitter (PBS) 706. PBS 706 divides the light into two beams. One beam with one polarization state illuminates first light coupling system 708. The other beam with the orthogonal polarization state reflects off fold mirror 714 and illuminates second light coupling system 716. First light coupling system 708 illuminates first optical fiber 710 which has first core 712. First optical fiber 710 illuminates homogenizing device 722. Second light coupling system 716 illuminates second optical fiber 718 which has core 720. Second optical fiber 718 combines with first optical fiber 710 to illuminate homogenizing device 722. Homogenizing device 722 illuminates projector 724. Rotating waveplate 704, PBS 706, and fold mirror 714 form variable light splitter 730. Variable light splitter 730, first light coupling system 708, second light coupling system 716, first optical fiber 710 with core 712, and second optical fiber 718 with core 720 form despeckling apparatus 700. Laser light source 702 may be a polarized, pulsed laser that has high enough peak power to produce SRS in first optical fiber 710 and second optical fiber 718. First light coupling system 708 and second light coupling system 716 each may be one lens, a sequence of lenses, or other optical components designed to focus light into first core 712 and second core 720 respectively. First optical fiber 710 and second optical fiber 718 each may be an optical fiber with a core size and length selected to produce the desired amount of SRS. First optical fiber 710 and second optical fiber 718 may be the same length or different lengths and may have the same core size or different core sizes. Additional elements may be included to further guide or despeckle the light such as additional lenses, diffusers, vibrators, or optical fibers.

Figure 8:
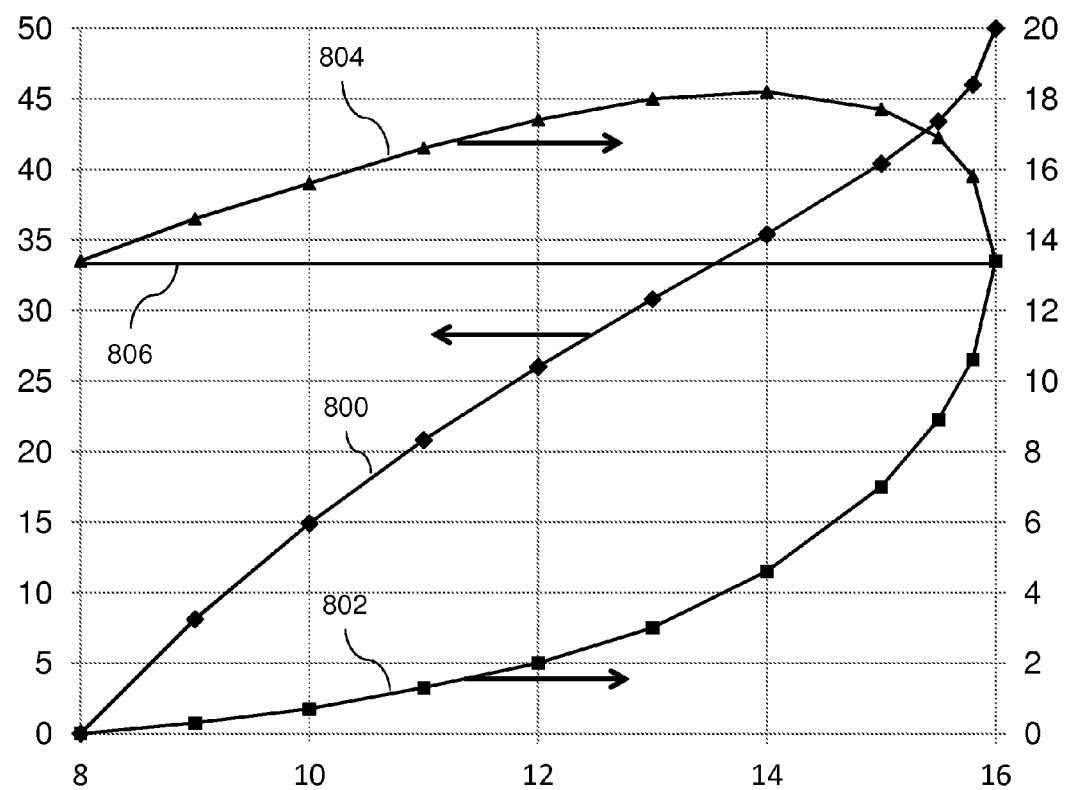
FIG. 8 is a graph of percent power into the first fiber, color out of the first fiber, and color out of the second fiber vs. total power for an adjustable despeckling apparatus.

FIG. 8 shows a graph of power in the first optical fiber, color out of the first optical fiber, and color out of the second optical fiber vs. total power for an adjustable despeckling apparatus of the type shown in FIG. 7. The x-axis represents total average optical power in watts. The mathematical model used to derive FIG. 8 assumes no losses (such as scatter, absorption, or coupling) so the input power in each fiber is equal to the output power from each fiber. The total optical power equals the sum of the power in the first fiber and the second fiber. The left y-axis represents power in percent, and the right y-axis represents GR color in percent. In the example of FIG. 8, the target color is the DCI green point (GR color=13.4%). By adjusting the variable light splitter, all points in FIG. 8 maintain the DCI green point for the combined outputs of the two fibers. The two fibers are identical and each has a core diameter and length selected such that they reach the DCI green point at 8 watts of average optical power. The cubic polynomial fit described for FIG. 5 is used for the mathematical simulation of FIG. 8. First curve 800 represents the power in the first fiber necessary to keep the combined total output of both fibers at the DCI green color point. Line 806 in FIG. 8 represents the DCI green color point at a GR color of 13.4%. At 8 watts of total average power, 0% power into the first fiber and 100% power into the second fiber gives the DCI green point because the second fiber is selected to give the DCI green point. As the total power is increased, the variable light splitter is adjusted so that more power is carried by the first fiber. The non-linear relationship between power and color (as shown in curve 500 of FIG. 5) allows the combined output of both fibers to stay at the DCI green point while the total power is increased. At the maximum average power of 16 watts, the first fiber has 50% of the total power, the second fiber has 50% of the total power, and each fiber carries 8 watts.

Second curve 802 in FIG. 8 represents the color of the output of the first fiber. Third curve 804 in FIG. 8 represents the color of the output of the second fiber. Third curve 804 reaches a maximum at approximately 14 watts of total average power which is approximately 9 watts of average power in the second fiber. Because 9 watts is larger than the 8 watts necessary to reach DCI green in the second fiber, the GR color of light out of the second fiber is approximately 18% which is higher than the 13.4% for DCI green. As the total average power is increased to higher than 14 watts, the amount of light in the second fiber is decreased. When 16 watts of total average power is reached, each fiber reaches 8 watts of average power. The example of FIG. 8 shows that by adjusting the amount of power in each fiber, the overall color may be held constant at DCI green even though the total average power varies from 8 to 16 watts. Although not shown in FIG. 8, the despeckling is also held approximately constant over the same power range.

The previous example uses two fibers of equal length, but the lengths may be unequal in order to accomplish specific goals such as lowest possible loss due to scattering along the fiber length, ease of construction, or maximum coupling into the fibers. In an extreme case, only one fiber may be used, so that the second path does not pass through a fiber. Instead of a variable light splitter based on polarization, other types of variable light splitters may be used. One example is a variable light splitter based on a wedged multilayer coating that moves to provide more or less reflection and transmission as the substrate position varies. Mirror coatings patterned on glass can accomplish the same effect by using a dense mirror fill pattern on one side of the substrate and a sparse mirror fill pattern on the other side of the substrate. The variable light splitter may be under software control and feedback may be used to determine the adjustment of the variable light splitter. The parameter used for feedback may be color, intensity, speckle contrast, or any other measurable characteristic of light. A filter to transmit only the Raman-shifted light, only one Raman peaks, or specifically selected Raman peaks may be used with a photo detector. By comparing to the total amount of green light or comparing to the un-shifted green peak, the amount of despeckling may be determined. Other adjustment methods may be used instead of or in addition to the two-fiber despeckler shown in FIG. 7. For example, variable optical attenuators may be incorporated into the fiber, the numerical aperture of launch into the fiber may be varied, or fiber bend radius may be varied.

The example of FIG. 8 is a mathematical approximation which does not include second order effects such as loss and the actual spectrum of SRS. Operational tests of an adjustable despeckler using two identical fibers according to the diagram in FIG. 7 show that the actual range of adjustability may be approximately 75% larger than the range shown in FIG. 8.

Figure 9:
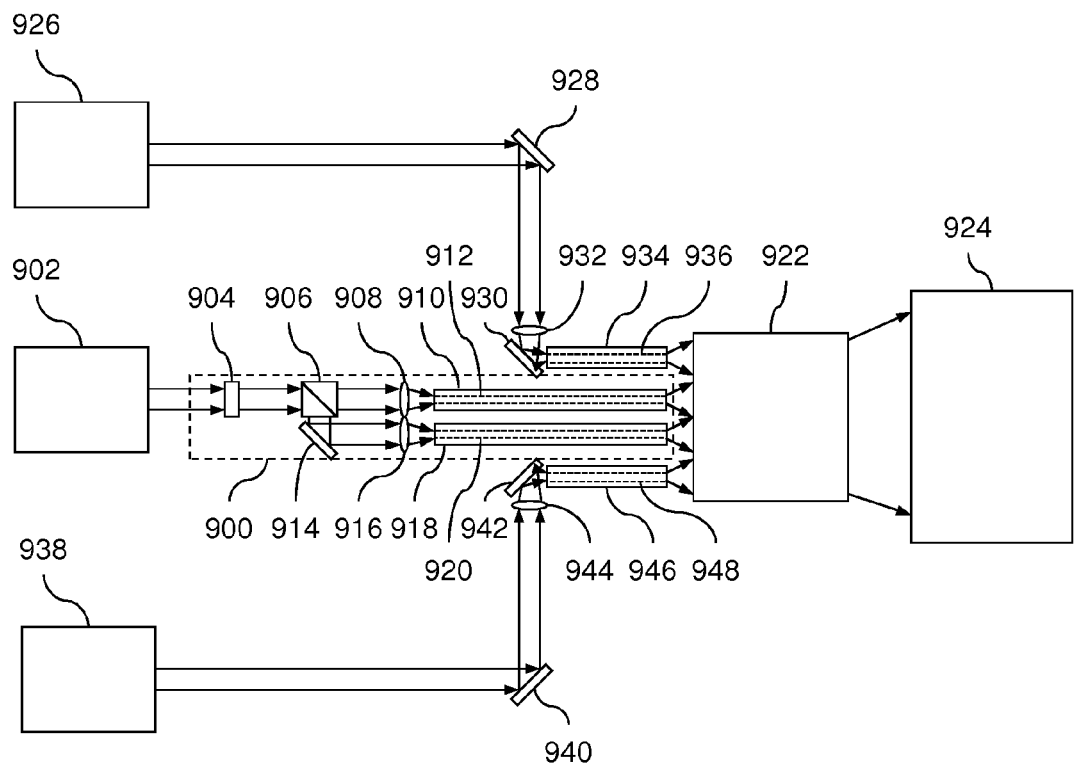
FIG. 9 is a top view of a three-color laser projection system with an adjustable despeckling apparatus.

For a three-color laser projector, all three colors must have low speckle for the resultant full-color image to have low speckle. If the green light is formed from a doubled, pulsed laser and the red and blue light are formed by an optical parametric amplifier (OPO) from the green light, the red and blue light may have naturally low speckle because of the broadening of the red and blue light from the OPO. A despeckling apparatus such as the one described in FIG. 7 may be used to despeckle only the green light. A top view of such a system is shown in FIG. 9. First laser light source 926 illuminates first fold mirror 928 which illuminates light coupling system 932. Light coupling system 932 illuminates second fold mirror 930. Second fold mirror 930 illuminates optical fiber 934 which has core 936. Optical fiber 934 illuminates homogenizing device 922. Second laser light source 902 illuminates rotating waveplate 904. Rotating waveplate 904 changes the polarization vector of the light so that it contains a desired amount of light in each of two polarization states. Rotating waveplate 904 illuminates PBS 906. PBS 906 divides the light into two beams. One beam with one polarization state illuminates second light coupling system 908. The other beam with the orthogonal polarization state reflects off third fold mirror 914 and illuminates third light coupling system 916. Second light coupling system 908 illuminates second optical fiber 910 which has second core 912. Second optical fiber 910 combines with first optical fiber 934 to illuminate homogenizing device 922. Third light coupling system 916 illuminates third optical fiber 918 which has core 920. Third optical fiber 918 combines with first optical fiber 934 and second optical fiber 910 to illuminate homogenizing device 922. Third laser light source 938 illuminates fourth fold mirror 940 which illuminates fourth light coupling system 944. Fourth light coupling system 944 illuminates fifth fold mirror 942. Fifth fold mirror 942 illuminates optical fiber 946 which has core 948. Fourth optical fiber 946 combines with first optical fiber 934, second optical fiber 910, and third optical fiber 918 to illuminate homogenizing device 922. Homogenizing device 922 illuminates projector 924. Rotating waveplate 904, PBS 906, third fold mirror 914, second light coupling system 908, third light coupling system 916, second optical fiber 910 with core 912, and third optical fiber 918 with core 920 form despeckling apparatus 900. First laser light source 926 may be a red laser, second laser light source 902 may be a green laser, and third laser light source 938 may be a blue laser. First laser light source 926 and third laser light source 938 may be formed by an OPO which operates on light from second laser light source 902. Second laser light source 902 may be a pulsed laser that has high enough peak power to produce SRS in second optical fiber 910 and third optical fiber 918. Additional elements may be included to further guide or despeckle the light such as additional lenses, diffusers, vibrators, or optical fibers.

FIG. 9 shows one color of light in each fiber. Alternatively, more than one color can be combined into a single fiber. For example, red light and blue light can both be carried by the same fiber, so that the total number of fibers is reduced from four to three. Another possibility is to combine red light and one green light in one fiber and combine blue light and the other green light in another fiber so that the total number of fibers is reduced to two.

Figure 10:
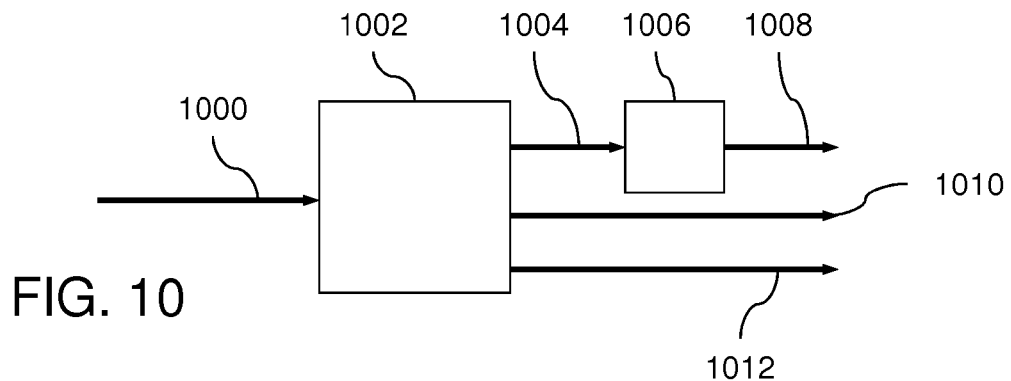
FIG. 10 is a block diagram of a three-color laser projection system with despeckling of light taken after an OPO.

The despeckling apparatus may operate on light taken before, after, or both before and after an OPO. The optimum location of the despeckling apparatus in the system may depend on various factors such as the amount of optical power available at each stage and the amount of despeckling desired. FIG. 10 shows a block diagram of a three-color laser projection system with despeckling of light taken after an OPO. First beam 1000 enters OPO 1002. OPO 1002 generates second beam 1004, fourth beam 1010, and fifth beam 1012. Second beam 1004 enters despeckling apparatus 1006. Despeckling apparatus 1006 generates third beam 1008. First beam 1000, second beam 1004, and third beam 1008 may be green light. Fourth beam 1010 may be red light, and fifth beam 1012 may be blue light. Despeckling apparatus 1006 may be a fixed despeckler or an adjustable despeckler.

Figure 11:
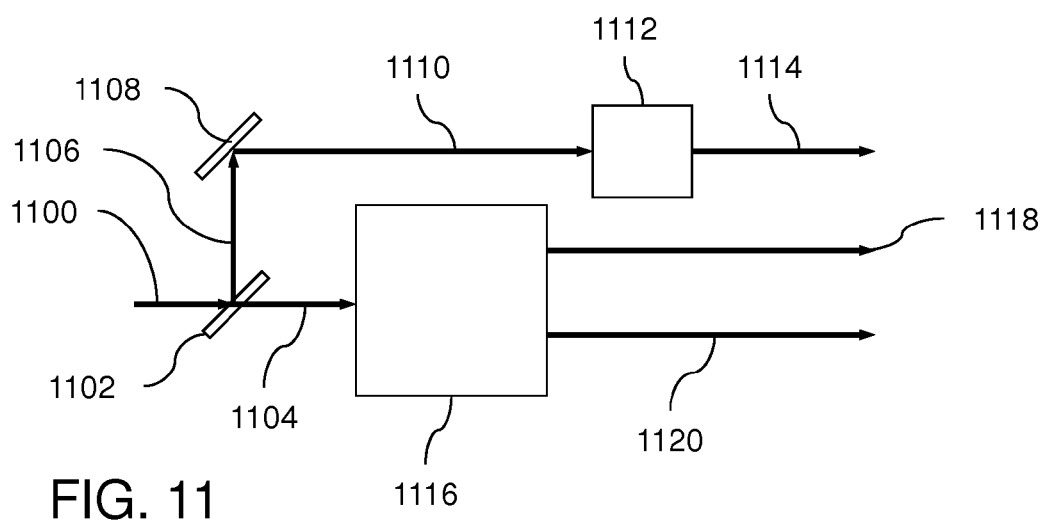
FIG. 11 is a block diagram of a three-color laser projection system with despeckling of light taken before an OPO.

FIG. 11 shows a block diagram of a three-color laser projection system with despeckling of light taken before an OPO. First beam 1100 is divided into second beam 1104 and third beam 1106 by splitter 1102. Third beam 1106 reflects from fold mirror 1108 to create fourth beam 1110. Fourth beam 1110 enters despeckling apparatus 1112. Despeckling apparatus 1112 generates fifth beam 1114. Second beam 1104 enters OPO 1116. OPO 1116 generates sixth beam 1118 and seventh beam 1120. First beam 1100, second beam 1104, third beam 1106, fourth beam 1110, and fifth beam 1114 may be green light. Sixth beam 1118 may be red light, and seventh beam 1120 may be blue light. Splitter 1102 may be a fixed splitter or a variable splitter. Despeckling apparatus 1112 may be a fixed despeckler or an adjustable despeckler.

Figure 12:
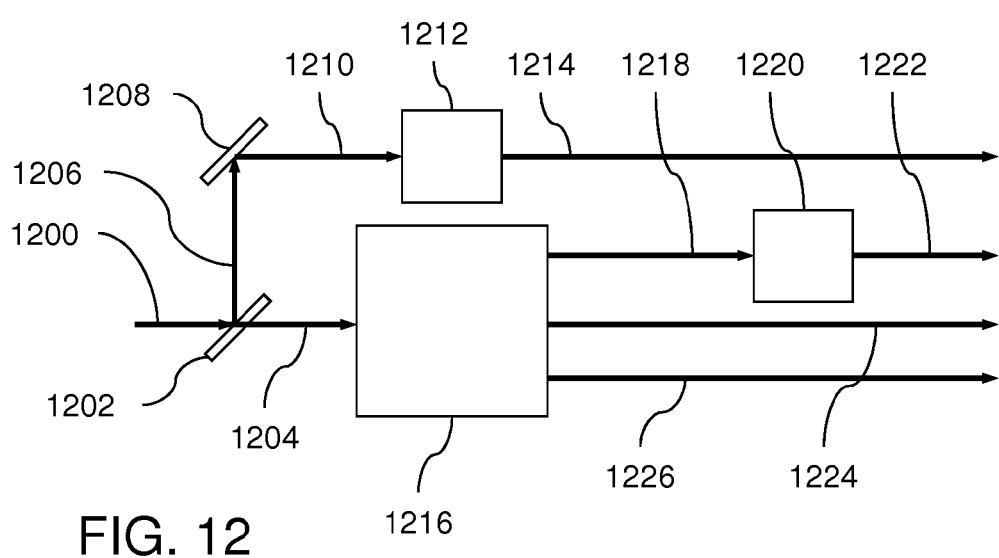
FIG. 12 is a block diagram of a three-color laser projection system with despeckling of light taken before and after an OPO.

FIG. 12 shows a block diagram of a three-color laser projection system with despeckling of light taken before and after an OPO. First beam 1200 is divided into second beam 1204 and third beam 1206 by splitter 1202. Third beam 1206 reflects from fold mirror 1208 to create fourth beam 1210. Fourth beam 1210 enters first despeckling apparatus 1212. First despeckling apparatus 1212 generates fifth beam 1214. Second beam 1204 enters OPO 1216. OPO 1216 generates sixth beam 1218, seventh beam 1224, and eighth beam 1226. Sixth beam 1218 enters second despeckling apparatus 1220. Second despeckling apparatus 1220 generates ninth beam 1222. First beam 1200, second beam 1204, third beam 1206, fourth beam 1210, fifth beam 1214, sixth beam 1218, and ninth beam 1222 may be green light. Seventh beam 1224 may be red light, and eighth beam 1226 may be blue light. Splitter 1202 may be a fixed splitter or a variable splitter. First despeckling apparatus 1212 and second despeckling apparatus 1220 may be fixed despecklers or adjustable despecklers.

Figure 13:
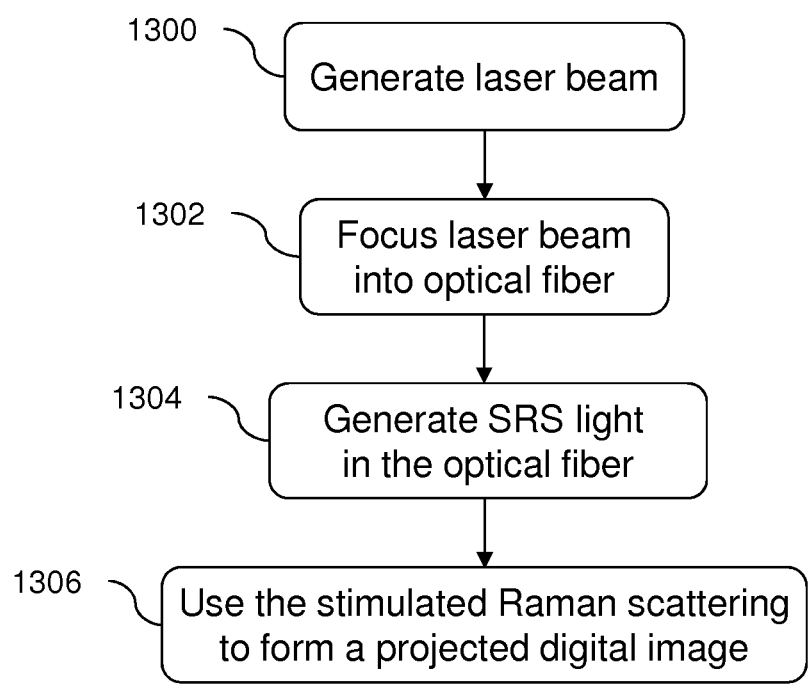
FIG. 13 is a flowchart of a despeckling method.

FIG. 13 shows a despeckling method that corresponds to the apparatus shown in FIG. 3. In step 1300, a laser beam is generated. In step 1302, the laser beam is focused into the core of an optical fiber. In step 1304, SRS light is generated in the optical fiber. In step 1306, the SRS light is used to form a projected digital image. Additional steps such as homogenizing, mixing, splitting, recombining, and further despeckling may also be included.

Figure 14:
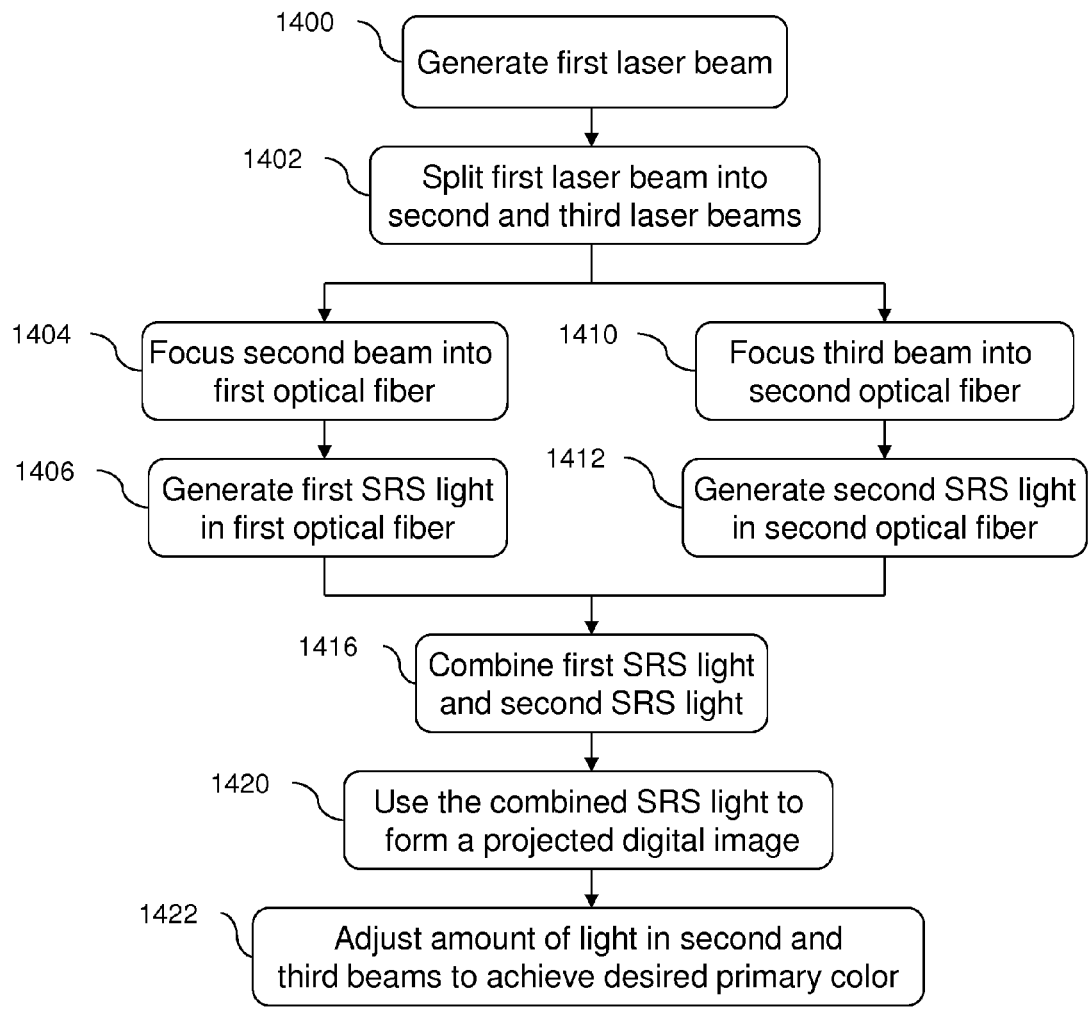
FIG. 14 is a flowchart of an adjustable despeckling method.

FIG. 14 shows an adjustable despeckling method that corresponds to the apparatus shown in FIG. 7. In step 1400, a first laser beam is generated. In step 1402, the first laser beam is split into second and third laser beams. In step 1404, the second laser beam is focused into the core of a first optical fiber. In step 1406, first SRS light is generated in the first optical fiber. In step 1410, the third laser beam is focused into the core of a second optical fiber. In step 1412, second SRS light is generated in the second optical fiber. In step 1416, the first SRS light and the second SRS light is combined. In step 1420, the combined SRS light is used to form a projected digital image. In step 1422, the amount of light in the second and third beams is adjusted to achieve a desired primary color. Additional steps such as homogenizing, mixing, further splitting, further recombining, and further despeckling may also be included.

Fibers used to generate SRS in a fiber-based despeckling apparatus may be single mode fibers or multimode fibers. Single mode fibers generally have a core diameter less than 10 micrometers. Multimode fibers generally have a core diameter greater than 10 micrometers. Multimode fibers may typically have core sizes in the range of 20 to 400 micrometers to generate the desired amount of SRS depending on the optical power required. For very high powers, even larger core sizes such as 1000 microns or 1500 microns may experience SRS. In general, if the power per cross-sectional area is high enough, SRS will occur. A larger cross-sectional area will require a longer length of fiber, if all other variables are held equal. The cladding of multimode fibers may have a diameter of 125 micrometers. The average optical power input into a multimode fiber to generate SRS may be in the range of 1 to 200 watts. The average optical power input into a single mode fiber to generate SRS is generally smaller than the average optical power required to generate SRS in a multimode fiber. The length of the multimode fiber may be in the range of 10 to 300 meters. For average optical power inputs in the range of 3 to 100 watts, the fiber may have a core size of 40 to 62.5 micrometers and a length of 50 to 100 meters. The core material of the optical fiber may be conventional fused silica or the core may be doped with materials such as germanium to increase the SRS effect or change the wavelengths of the SRS peaks.

In order to generate SRS, a large amount of optical power must be coupled into an optical fiber with a limited core diameter. For efficient and reliable coupling, specially built lenses, fibers, and alignment techniques may be necessary. 80 to 90% of the optical power in a free-space laser beam can usually be coupled into a multimode optical fiber. Large-diameter end caps, metalized fibers, double clad fibers, antireflection coatings on fiber faces, gradient index lenses, high temperature adhesives, and other methods are commercially available to couple many tens of watts of average optical power into fibers with core diameters in the range of 30 to 50 micrometers. Photonic or "holey" fibers may be used to make larger diameters with maintaining approximately the same Raman shifting effect. Average optical power in the hundreds of watts can be coupled into fibers with core sizes in the range of 50 to 100 micrometers. The maximum amount of SRS, and therefore the minimum amount of speckle, may be determined by the maximum power that can be reliably coupled into fibers.

Optical fibers experience scattering and absorption which cause loss of optical power. In the visible light region, the main loss is scattering. Conventional fused silica optical fiber has a loss of approximately 15 dB per kilometer in the green. Specially manufactured fiber may be green-optimized so that the loss is 10 dB per kilometer or less in the green. Loss in the blue tends to be higher than loss in the green. Loss in the red tends to be lower than loss in the green. Even with low-loss fiber, the length of fiber used for despeckling may be kept as short as possible to reduce loss. Shorter fiber means smaller core diameter to reach the same amount of SRS and therefore the same amount of despeckling. Since the difficulty of coupling high power may place a limit on the amount of power that can be coupled into a small core, coupling may also limit the minimum length of the fiber.

Lasers used with a fiber-based despeckling apparatus may be pulsed in order to reach the high peak powers required for SRS. The pulse width of the optical pulses may be in the range of 5 to 100 ns. Pulse frequencies may be in the range of 5 to 300 kHz. Peak powers may be in the range of 1 to 1000 W. The peak power per area of core (PPPA) is a metric that can help predict the amount of SRS obtained. The PPPA may be in the range of 1 to 5 kW per micrometer$^2$ in order to produce adequate SRS for despeckling. Pulsed lasers may be formed by active or passive Q-switching or other methods that can reach high peak power. The mode structure of the pulsed laser may include many peaks closely spaced in wavelength. Other nonlinear effects in addition to SRS may be used to add further despeckling. For example, self-phase modulation or four wave mixing may further broaden the spectrum to provide additional despeckling. Infrared light may be introduced to the fiber to increase the nonlinear broadening effects.

The despeckling apparatus of FIG. 3 or adjustable despeckling apparatus of FIG. 7 may be used to generate more than one primary color. For example, red primary light may be generated from green light by SRS in an optical fiber to supply some or all of the red light required for a full-color projection display. Since the SRS light has low speckle, adding SRS light to other laser light may reduce the amount of speckle in the combined light. Alternatively, if the starting laser is blue, some or all of the green primary light and red primary light may be generated from blue light by SRS in an optical fiber. Filters may be employed to remove unwanted SRS peaks. In the case of SRS from green light, the red light may be filtered out, or all peaks except the first SRS peak may be filtered out. This filtering will reduce the color change for a given amount of despeckling, but comes at the expense of efficiency if the filtered peaks are not used to help form the viewed image. Filtering out all or part of the un-shifted peak may decrease the speckle because the un-shifted peak typically has a narrower bandwidth than the shifted peaks.

The un-shifted peak after fiber despeckling is a narrow peak that contributes to the speckle of the light exciting the fiber. This unshifted peak may be filtered out from the spectrum (for example using a dichroic filter) and sent into a second despeckling fiber to make further Raman-shifted peaks and thus reduce the intensity of the un-shifted peak while retaining high efficiency. Additional despeckling fibers may cascaded if desired as long as sufficient energy is available in the un-shifted peak.

There are usually three primary colors in conventional full-color display devices, but additional primary colors may also be generated to make, for example, a four-color system or a five-color system. By dividing the SRS light with beamsplitters, the peaks which fall into each color range can be combined together to form each desired primary color. A four-color system may consist of red, green, and blue primaries with an additional yellow primary generated from green light by SRS in an optical fiber. Another four-color system may be formed by a red primary, a blue primary, a green primary in the range of 490 to 520 nm, and another green primary in the range of 520 to 550 nm, where the green primary in the range of 520 to 550 nm is generated by SRS from the green primary in the range of 490 to 520 nm. A five-color system may have a red primary, a blue primary, a green primary in the range of 490 to 520 nm, another green primary in the range of 520 to 550 nm, and a yellow primary, where the green primary in the range of 520 to 550 nm and the yellow primary are generated by SRS from the green primary in the range of 490 to 520 nm.

3D projected images may be formed by using SRS light to generate some or all of the peaks in a six-primary 3D system. Wavelengths utilized for a laser-based six-primary 3D system may be approximately 440 and 450 nm, 525 and 540 nm, and 620 and 640 nm in order to fit the colors into the blue, green, and red bands respectively and have sufficient spacing between the two sets to allow separation by filter glasses. Since the spacing of SRS peaks from a pure fused-silica core is 13.2 THz, this sets a spacing of approximately 9 nm in the blue, 13 nm in the green, and 17 nm in the red. Therefore, a second set of primary wavelengths at 449 nm, 538 nm, and 637 nm can be formed from the first set of primary wavelengths at 440 nm, 525 nm, and 620 nm by utilizing the first SRS-shifted peaks. The second set of primaries may be generated in three separate fibers, or all three may be generated in one fiber. Doping of the fiber core may be used to change the spacing or generate additional peaks.

Another method for creating a six-primary 3D system is to use the un-shifted (original) green peak plus the third SRS-shifted peak for one green channel and use the first SRS-shifted peak plus the second SRS-shifted peak for the other green channel. Fourth, fifth, and additional SRS-shifted peaks may also be combined with the un-shifted and third SRS-shifted peaks. This method has the advantage of roughly balancing the powers in the two channels. One eye will receive an image with more speckle than the other eye, but the brain can fuse a more speckled image in one eye with a less speckled image in the other eye to form one image with a speckle level that averages the two images. Another advantage is that although the wavelengths of the two green channels are different, the color of the two channels will be more closely matched than when using two single peaks from adjacent green channels. Two red channels and two blue channels may be produced with different temperatures in two OPOs which naturally despeckle the light.

Almost degenerate OPO operation can produce two wavelengths that are only slightly separated. In the case of green light generation, two different bands of green light are produced rather than red and blue bands. The two green wavelengths may be used for the two green primaries of a six-primary 3D system. If the OPO is tuned so that its two green wavelengths are separated by the SRS shift spacing, SRS-shifted peaks from both original green wavelengths will line up at the same wavelengths. This method can be used to despeckle a system utilizing one or more degenerate OPOs.

A different starting wavelength may used to increase the amount of Raman-shifted light while still maintaining a fixed green point such as DCI green. For example, a laser that generates light at 515 nm may be used as the starting wavelength and more Raman-shifted light generated to reach the DCI green point when compared to a starting wavelength of 523.5 nm. The effect of starting at 515 nm is that the resultant light at the same green point will have less speckle than light starting at 523.5 nm.

When two separate green lasers, one starting at 523.5 nm and one starting at 515 nm, are both fiber despeckled and then combined into one system, the resultant speckle will be even less than each system separately because of the increased spectral diversity. The Raman-shifted peaks from these two lasers will interleave to make a resultant waveform with approximately twice as many peaks as each green laser would have with separate operation.

A separate blue boost may also be added from a narrow band laser at any desired wavelength because speckle is very hard to see in blue even with narrow band light. The blue boost may be a diode-pumped solid-state (DPSS) or direct diode laser. The blue boost may form one of the blue peaks in a six-primary 3D display. If blue boost is used, any OPOs in the system may be tuned to produce primarily red or red only so as to increase the red efficiency.

Peaks that are SRS-shifted from green to red may be added to the red light from an OPO or may be used to supply all the red light if there is no OPO. In the case of six-primary 3D, one or more peaks shifted to red may form or help form one or more of the red channels.

Instead of or in addition to fused silica, materials may be used that add, remove, or alter SRS peaks as desired. These additional materials may be dopants or may be bulk materials added at the beginning or the end of the optical fiber.

The cladding of the optical fiber keeps the peak power density high in the fiber core by containing the light in a small volume. Instead of or in addition to cladding, various methods may be used to contain the light such as mirrors, focusing optics, or multi-pass optics. Instead of an optical fiber, larger diameter optics may used such as a bulk glass or crystal rod or rectangular parallelepiped. Multiple passes through a crystal or rod may be required to build sufficient intensity to generate SRS. Liquid waveguides may be used and may add flexibility when the diameter is increased.

Polarization-preserving fiber or other polarization-preserving optical elements may be used to contain the light that generates SRS. A rectangular-cross-section integrating rod or rectangular-cross-section fiber are examples of polarization-preserving elements. Polarization-preserving fibers may include core asymmetry or multiple stress-raising rods that guide polarized light in such a way as to maintain polarization.

In a typical projection system, there is a trade-off between brightness, contrast ratio, uniformity, and speckle. High illumination f# tends to produce high brightness and high contrast ratio, but also tends to give low uniformity and more speckle. Low illumination f# tends to produce high uniformity and low speckle, but also tends to give low brightness and low contrast ratio. By using spectral broadening to reduce speckle, the f# of the illumination system can be raised to help increase brightness and contrast ratio while keeping low speckle. Additional changes may be required to make high uniformity at high f#, such as a longer integrating rod, or other homogenization techniques which are known and used in projection illumination assemblies.

If two OPOs are used together, the OPOs may be adjusted to slightly different temperatures so that the resultant wavelengths are different. Although the net wavelength can still achieve the target color, the bandwidth is increased to be the sum of the bandwidths of the individual OPOs. Increased despeckling will result from the increased bandwidth. The bands produced by each OPO may be adjacent, or may be separated by a gap. In the case of red and blue generation, both red and blue will be widened when using this technique. For systems with three primary colors, there may be two closely-spaced red peaks, four or more green peaks, and two closely-spaced blue peaks. For systems with six primary colors, there may be three or more red peaks with two or more of the red peaks being closely spaced, four or more green peaks, and three or more blue peaks with two or more of the blue peaks being closely spaced. Instead of OPOs, other laser technologies may be used that can generate the required multiple wavelengths.

Screen vibration or shaking is a well-known method of reducing speckle. The amount of screen vibration necessary to reduce speckle to a tolerable level depends on a variety of factors including the spectral diversity of the laser light impinging on the screen. By using Raman to broaden the spectrum of light, the required screen vibration can be dramatically reduced even for silver screens or high-gain white screens that are commonly used for polarized 3D or very large theaters. These specialized screens typically show more speckle than low-gain screens. When using Raman despeckling, screen vibration may be reduced to a level on the order of a millimeter or even a fraction of a millimeter, so that screen vibration becomes practical and easily applied even in the case of large cinema screens.

When the Raman despeckling process is driven with high enough peak power, the green starting wavelength may be Raman shifted through the yellow wavelengths and out to red wavelengths. If sufficient red is produced, both broadband green light and broadband red light can be made simultaneously from the same starting laser. Such a system can provide both green and red primary colors for digital projection. When blue light is added separately, all three of the conventional primary colors are available to form full color digital images.

The starting green wavelength may be selected to generate a sufficient amount of Raman-shifted red light. If the starting wavelength is 532 nm, more red may be generated than if starting at 523.5 nm, for example, because 532 nm requires less Raman shift to reach the red range of wavelengths. If the x-value of the green primary color generated by the Raman shift process is not low enough to maintain the correct green point (to meet the DCI standard, the x-value should be 0.265), green laser diodes may be added in the approximate range of 515 nm to 525 nm to pull the x-value down. Similarly, if the x-value of the red primary color generated by the Raman shift process is not high enough to maintain the desired red point (to meet the DCI standard, the x-value should be 0.68), red laser diodes may be added to pull the x-value up.

Control of the despeckling process may be achieved by varying the repetition rate of the pulsed laser. For master-oscillator power-amplifier (MOPA) laser systems such as some of the conventionally available fiber lasers, the average laser output power may generally be adjusted without affecting peak power or pulse width by changing the pulse repetition rate. In this case, the brightnesses of Raman-shifted green and red primaries can be kept constant over time or changed to achieve various effects such as equal brightness of 2D mode and 3D mode. The despeckled color of green and red may stay substantially constant over a wide range of repetition rate, which may be useful for adjusting brightness while maintaining the desired color points of the green and red primaries in digital projection applications.

With the proper laser wavelengths and appropriate filtering for each eye, color-separated stereoscopic projection may be realized while maintaining the full DCI color space for each eye and while balancing the amount of light so that equal amounts are generated for each eye. Certain specific combinations of lasers and wavelengths may be found that satisfy both color-balance and brightness-balance requirements. Although most achievable laser combinations do not fit these requirements, trial and error methods were used to find two implementations that may be realized with existing lasers at minimal system cost.

The green and red light generated by SRS in an optical fiber may be filtered into peaks that are directed to the left and right eyes and viewed with matching glasses that pass and block the appropriate peaks. One of the green primaries may be supplemented by green laser diodes in the approximate range of 515 to 525 nm. The shortwave red may be supplemented with red laser diodes at approximately 638 nm. The longwave red may be generated by red laser diodes in the range of approximately 650 to 680 nm. If the longest wavelength of the shortwave red is 638 nm, the far red laser diodes may be at 658 nm to ensure sufficient separation between the two eyes.

Figure 15:
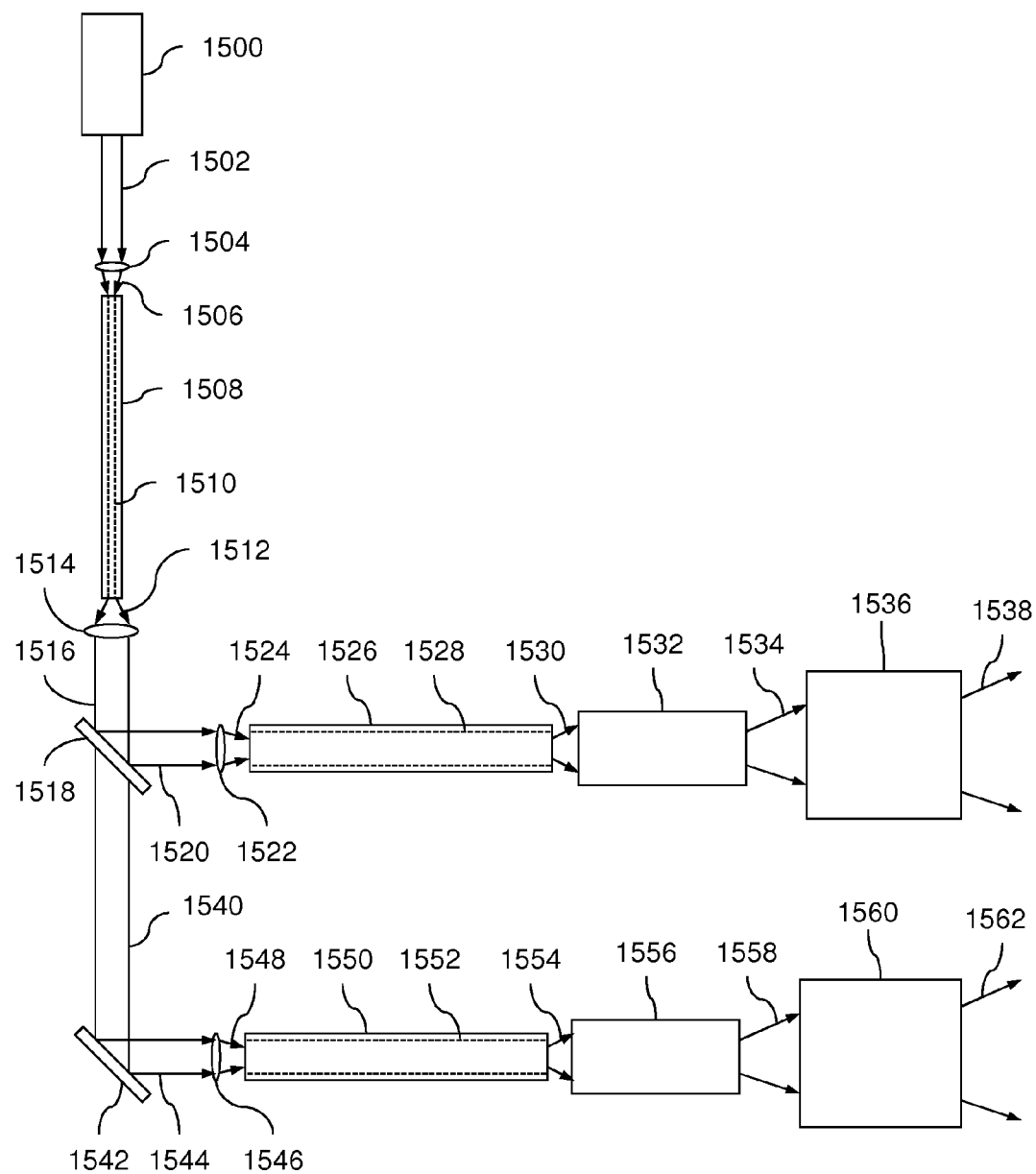
FIG. 15 is a top view of a stereoscopic laser projection system with a pulsed green laser that generates green and red light.

FIG. 15 shows a top view of a stereoscopic laser projection system with a pulsed green laser that generates green and red light. Pulsed green laser 1500 generates first light beam 1502. First light beam 1502 illuminates first coupling lens 1504. First coupling lens 1504 focuses to produce second light beam 1506. Second light beam 1506 illuminates first core 1510 of first optical fiber 1508. First optical fiber 1508 generates third light beam 1512. Third light beam 1512 illuminates second coupling lens 1514. Second coupling lens 1514 collimates to produce fourth light beam 1516. Part of fourth light beam 1516 reflects from beamsplitter 1518 to produce fifth light beam 1520. Fifth light beam 1520 illuminates third coupling lens 1522. Third coupling lens 1522 focuses to produce sixth light beam 1524. Sixth light beam 1524 illuminates second core 1528 of second optical fiber 1526. Second optical fiber 1526 generates seventh light beam 1530. Seventh light beam 1530 illuminates first mixing rod 1532. First mixing rod 1532 generates eighth light beam 1534. Eighth light beam 1534 illuminates first projector 1536. First projector 1536 forms ninth light beam 1538. Ninth light beam 1538 forms the first image of a stereoscopic projection system.

Part of fourth light beam 1516 transmits through beamsplitter 1518 to produce tenth light beam 1540. Tenth light beam 1540 reflects from mirror 1542 to produce eleventh light beam 1544. Eleventh light beam 1544 illuminates fourth coupling lens 1546. Fourth coupling lens 1546 focuses to produce twelfth light beam 1548. Twelfth light beam 1548 illuminates third core 1552 of third optical fiber 1550. Third optical fiber 1550 generates thirteenth light beam 1554. Thirteenth light beam 1554 illuminates second mixing rod 1556. Second mixing rod 1556 generates fourteenth light beam 1558. Fourteenth light beam 1558 illuminates second projector 1560. Second projector 1560 forms fifteenth light beam 1562. Fifteenth light beam 1562 forms the second image of a stereoscopic projection system. First optical fiber 1508 has an appropriate core size to generate green and red SRS light. Beamsplitter 1518 reflects green SRS light and transmits red SRS light. Second optical fiber 1526 and third optical fiber 1550 are delivery fibers that have core sizes large enough so that SRS light is not generated. Mirror 1542 may not be necessary if the optical layout allows non-parallel beams of light to enter second optical fiber 1526 and third optical fiber 1550. First mixing rod 1532 may be incorporated into first projector 1536, and second mixing rod 1556 may be incorporated into second projector 1560. Ninth light beam 1538 and fifteenth light beam 1562 may be aligned to form stereoscopic images on a projection screen when viewed with appropriate color-filter glasses.

Figure 16:
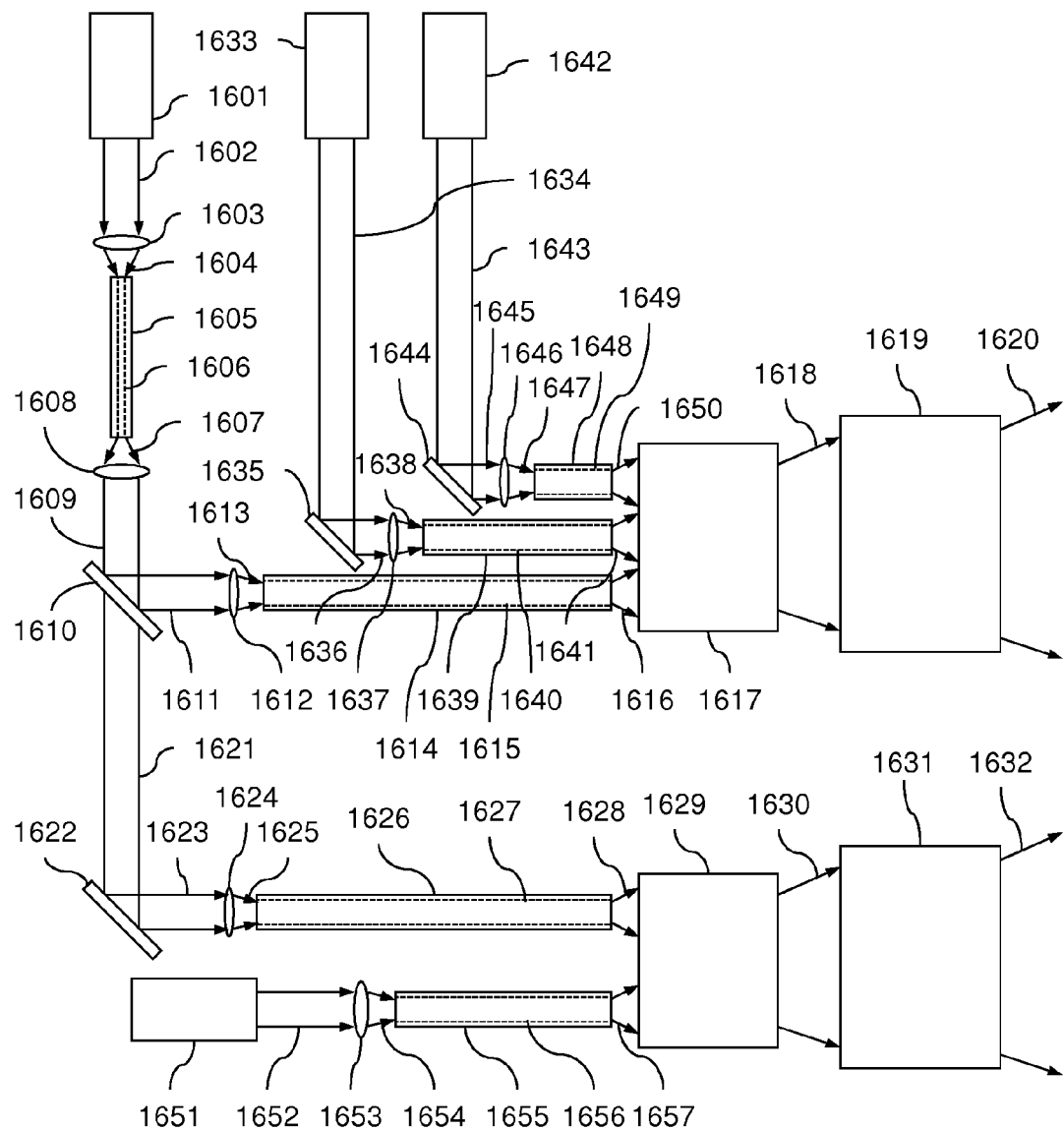
FIG. 16 is a top view of a stereoscopic laser projection system with a pulsed green laser and optical fiber that generate green and red light, a green laser that generates green light, a green laser diode assembly, and a red laser diode assembly.

FIG. 16 shows a top view of a stereoscopic laser projection system with a pulsed green laser and optical fiber that generate green and red light, a green laser that generates green light, a green laser diode assembly, and a red laser diode assembly. Pulsed green laser 1601 generates first light beam 1602. First light beam 1602 illuminates first coupling lens 1603. First coupling lens 1603 focuses to produce second light beam 1604. Second light beam 1604 illuminates first core 1606 of first optical fiber 1605. First optical fiber 1605 generates third light beam 1607. Third light beam 1607 illuminates second coupling lens 1608. Second coupling lens 1608 collimates to produce fourth light beam 1609. Part of fourth light beam 1609 reflects from beamsplitter 1610 to produce fifth light beam 1611. Fifth light beam 1611 illuminates third coupling lens 1612. Third coupling lens 1612 focuses to produce sixth light beam 1613. Sixth light beam 1613 illuminates second core 1615 of second optical fiber 1614. Second optical fiber 1614 generates seventh light beam 1616. Seventh light beam 1616 illuminates first mixing rod 1617. First mixing rod 1617 generates eighth light beam 1618. Eighth light beam 1618 illuminates first projector 1619. First projector 1619 forms ninth light beam 1620. Ninth light beam 1620 forms the first image of a stereoscopic projection system.

Part of fourth light beam 1609 transmits through beamsplitter 1610 to produce tenth light beam 1621. Tenth light beam 1621 reflects from first mirror 1622 to produce eleventh light beam 1623. Eleventh light beam 1623 illuminates fourth coupling lens 1624. Fourth coupling lens 1624 focuses to produce twelfth light beam 1625. Twelfth light beam 1625 illuminates third core 1627 of third optical fiber 1626. Third optical fiber 1626 generates thirteenth light beam 1628. Thirteenth light beam 1628 illuminates second mixing rod 1629. Second mixing rod 1629 generates fourteenth light beam 1630. Fourteenth light beam 1630 illuminates second projector 1631. Second projector 1631 forms fifteenth light beam 1632. Fifteenth light beam 1632 forms the second image of a stereoscopic projection system. Green laser diode assembly 1633 generates sixteenth light beam 1634. Sixteenth light beam 1634 reflects from second mirror 1635 to produce seventeenth light beam 1636. Seventeenth light beam 1636 illuminates fifth coupling lens 1637. Fifth coupling lens 1637 focuses to produce eighteenth light beam 1638. Eighteenth light beam 1638 illuminates fourth core 1640 of fourth optical fiber 1639. Fourth optical fiber 1639 generates nineteenth light beam 1641. Nineteenth light beam 1641 combines with seventh light beam 1616 to illuminate first mixing rod 1617.

Red laser diode assembly 1642 generates twentieth light beam 1643. Twentieth light beam 1643 reflects from third mirror 1644 to produce twenty first light beam 1645. Twenty first light beam 1645 illuminates sixth coupling lens 1646. Sixth coupling lens 1646 focuses to produce twenty second light beam 1647. Twenty second light beam 1647 illuminates fifth core 1649 of fifth optical fiber 1648. Fifth optical fiber 1648 generates twenty third light beam 1650. Twenty third light beam 1650 combines with seventh light beam 1616 and nineteenth light beam 1641 to illuminate first mixing rod 1617. Green laser 1651 generates twenty fourth light beam 1652. Twenty fourth light beam 1652 illuminates seventh coupling lens 1653. Seventh coupling lens 1653 focuses to produce twenty fifth light beam 1654. Twenty fifth light beam 1654 illuminates sixth core 1656 of sixth optical fiber 1655. Sixth optical fiber 1655 generates twenty sixth light beam 1657. Twenty sixth light beam 1657 combines with thirteenth light beam 1628 to illuminate second mixing rod 1629.

First optical fiber 1605 has an appropriate core size to generate green and red SRS light. Beamsplitter 1610 reflects green SRS light and transmits red SRS light. Second optical fiber 1614, third optical fiber 1626, fourth optical fiber 1639, fifth optical fiber 1648, and sixth optical fiber 1655 are delivery fibers that have core sizes large enough so that SRS light is not generated. First mirror 1622, second mirror 1635, and third mirror 1644 may not be necessary if the optical layout allows non-parallel beams of light to enter second optical fiber 1614, third optical fiber 1626, fourth optical fiber 1639, fifth optical fiber 1648, and sixth optical fiber 1655. First mixing rod 1617 may be incorporated into first projector 1619, and second mixing rod 1629 may be incorporated into second projector 1631. Ninth light beam 1620 and fifteenth light beam 1632 may be aligned to form stereoscopic images on a projection screen when viewed with appropriate color-filter glasses. Green laser 1651 may be a pulsed or continuous-wave laser.

Figure 17:
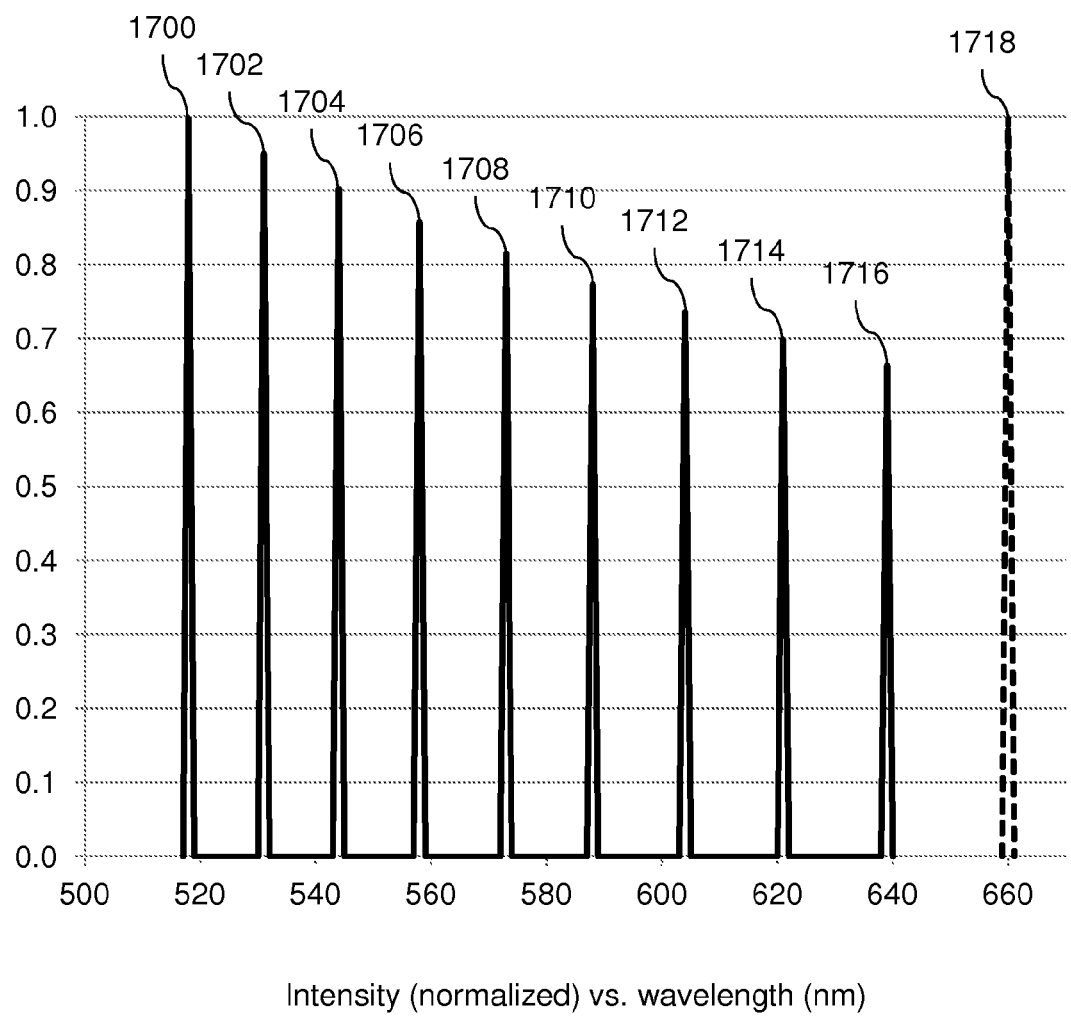
FIG. 17 is a graph of intensity vs. wavelength for a pulsed green laser and optical fiber that generate green light and red light, and a far-red laser diode assembly.

FIG. 17 shows a graph of intensity vs. wavelength for a pulsed green laser and optical fiber that generate green light and red light, and a far-red laser diode assembly. The horizontal axis represents wavelength in nanometers and the vertical axis represents normalized light intensity. First peak 1700 is generated by a pulsed green laser and is the starting wavelength to generate SRS light in an optical fiber. Second peak 1702, third peak 1704, fourth peak 1706, fifth peak 1708, sixth peak 1710, seventh peak 1712, eighth peak 1714, and ninth peak 1716 are SRS-shifted peaks generated in an optical fiber. Tenth peak 1718 is generated from a far-red laser diode assembly. First peak 1700, second peak 1702, third peak 1704, fourth peak 1706, fifth peak 1708, and sixth peak 1710 may be considered green light. Seventh peak 1712, eighth peak 1714, and ninth peak 1716 may be considered shortwave red light. Tenth peak 1718 may be considered longwave red light.

The relative heights of first peak 1700, second peak 1702, third peak 1704, fourth peak 1706, fifth peak 1708, and sixth peak 1710, seventh peak 1712, eighth peak 1714, ninth peak 1716, and tenth peak 1718 may be determined by the parameters of the optical fiber, pulsed green and far-red laser powers, pulsed laser characteristics, and other factors. Although not shown to scale in FIG. 17, first peak 1700 is typically a very narrow peak that has a width of much less than one nanometer, whereas second peak 1702, third peak 1704, fourth peak 1706, fifth peak 1708, and sixth peak 1710, seventh peak 1712, eighth peak 1714, and ninth peak 1716 are SRS-broadened peaks that have a width on the order of 2 to 10 nm wide. First peak 1700 is shown in FIG. 17 as starting at 518 nm, but may start at any green wavelength. To fit within the constraints of the DCI green color point and wavelengths obtainable from commercially available pulsed green fiber lasers, first peak 1700 may be in the approximate range of 515 to 540 nm.

Figure 18:
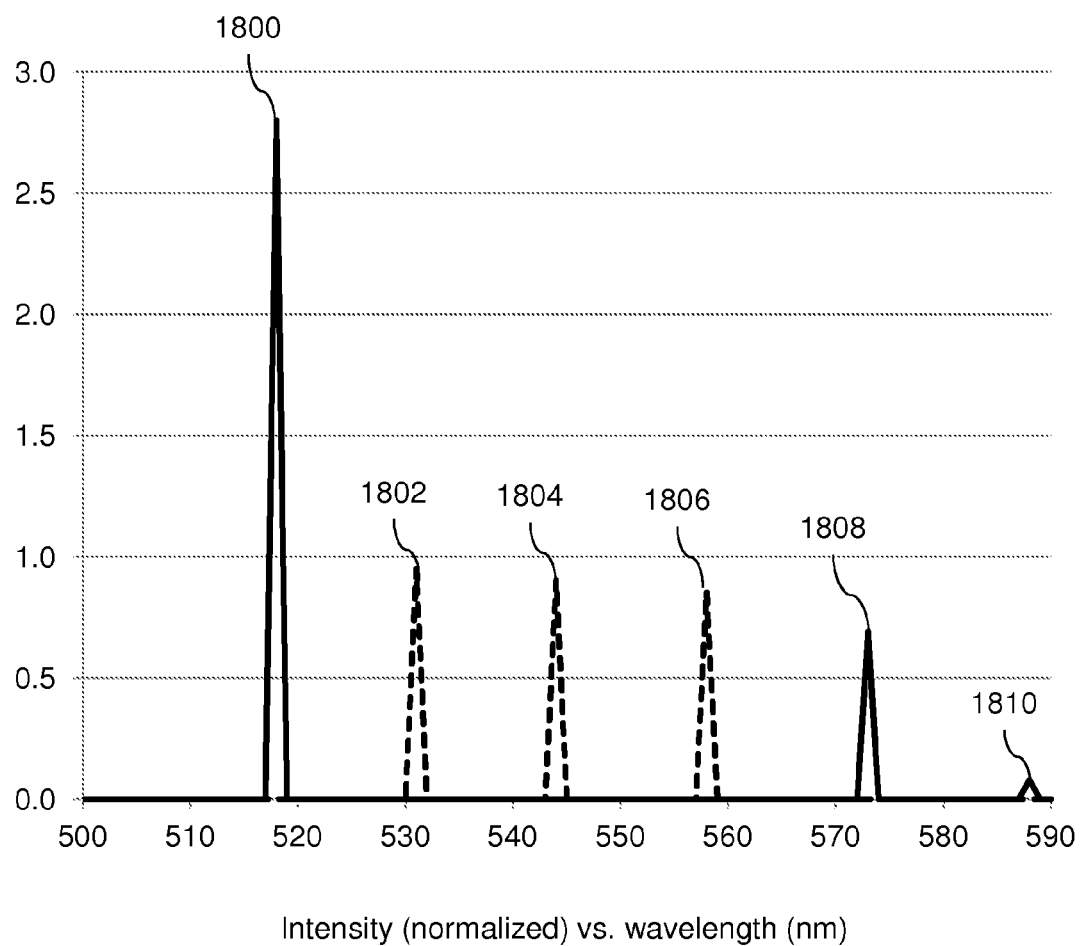
FIG. 18 is a graph of intensity vs. wavelength for a stereoscopic projection system that uses a pulsed green laser and a green laser diode assembly.

FIG. 18 shows a graph of intensity vs. wavelength for a stereoscopic projection system that uses a pulsed green laser and a green laser diode assembly. The horizontal axis represents wavelength in nanometers and the vertical axis represents normalized light intensity. As a starting point, the spectrum shown is FIG. 17 is used. Only the green portion of the spectrum is shown in FIG. 18. First peak 1800 is a combination of the starting peak of a pulsed green laser at 518 nm as shown in FIG. 17 with the addition of light from a green laser diode assembly at 518 nm. Second peak 1802, third peak 1804, fourth peak 1806, fifth peak 1808, and sixth peak 1810 are SRS-shifted peaks generated in an optical fiber as in FIG. 17. A solid line is shown for first peak 1800, fifth peak 1808, and sixth peak 1810 indicating that those peaks form the first green primary of a stereoscopic image. A dashed line is shown for second peak 1802, third peak 1804, and fourth peak 1806 indicating that those peaks form the second green primary of the same stereoscopic image. Fifth peak 1806 is shown slightly reduced and sixth peak 1810 is shown much reduced by projector transmission at the long edge of the green band which typically cuts off in the range of approximately 570 to 590 nm. In this example, if the intensity of the first green peak from the pulsed laser is normalized to 1, the intensity of the green laser diodes is 1.8.

Figure 19:
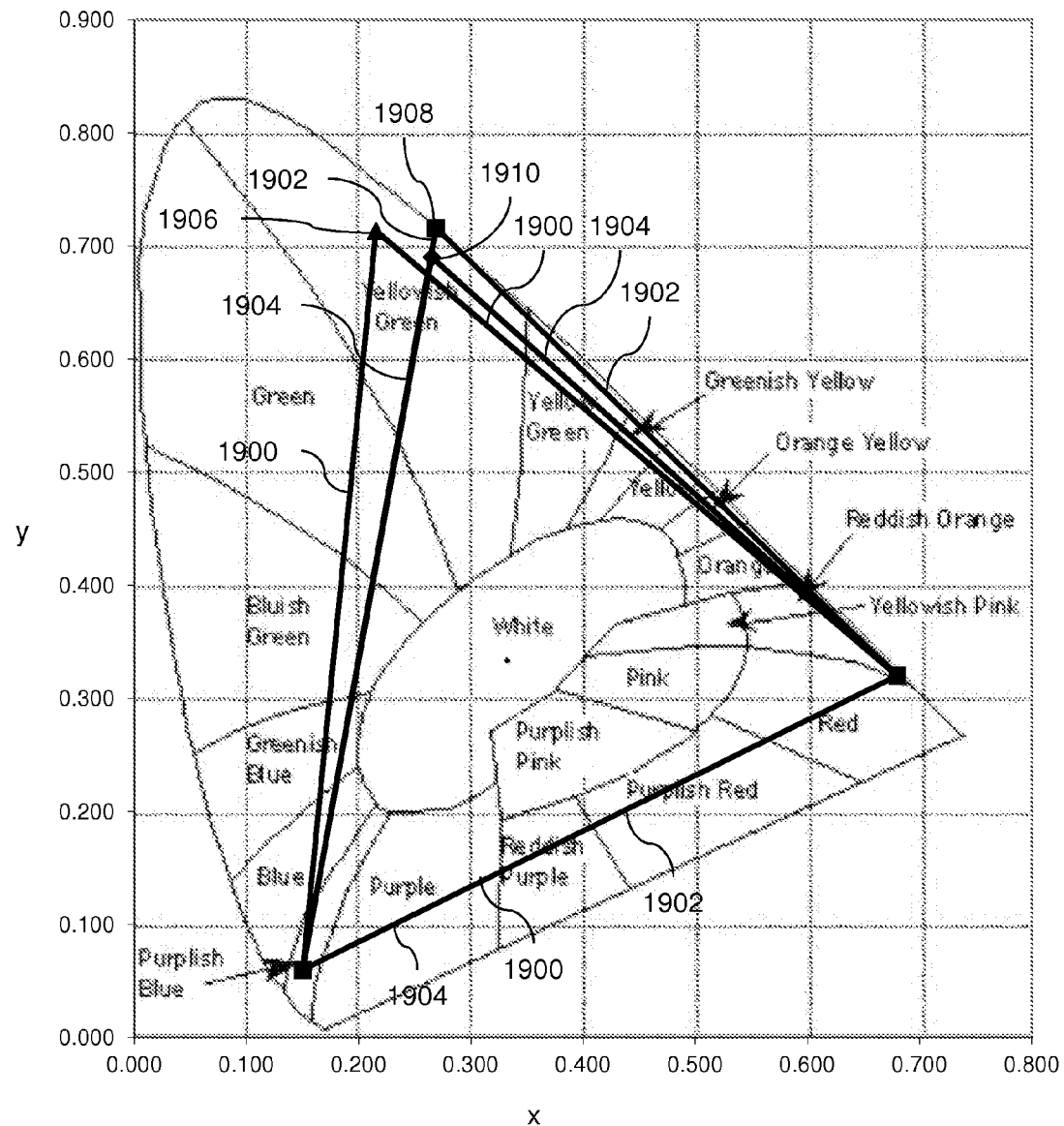
FIG. 19 is a color chart of a color gamut from a stereoscopic projection system that uses a pulsed green laser and a green laser diode assembly.

FIG. 19 shows a color chart of a color gamut from a stereoscopic projection system that uses a pulsed green laser and a green laser diode assembly. The x and y axes represent the x and y coordinates of the CIE 1931 color space. First triangle 1900 shows a color gamut with blue and red primary colors at the DCI standard, and a green primary at first point 1906 corresponding to the first green primary in FIG. 17. Second triangle 1902 shows a color gamut with blue and red primary colors at the DCI standard, and a green primary at second point 1908 corresponding to the second green primary in FIG. 17. Third triangle 1904 shows the color gamut of the DCI standard with a green primary at third point 1910. First triangle 1900 and second triangle 1902 each include almost the entire region of third triangle 1904 which shows that both images of the stereoscopic image can substantially meet the color requirements of the DCI standard. When the two eyes are combined, the average will meet the DCI requirements even better than each image separately. In actuality, two different red primaries (not shown in FIG. 17) and two different blue primaries (not shown in FIG. 17) would be used for stereoscopic projection.

Figure 20:
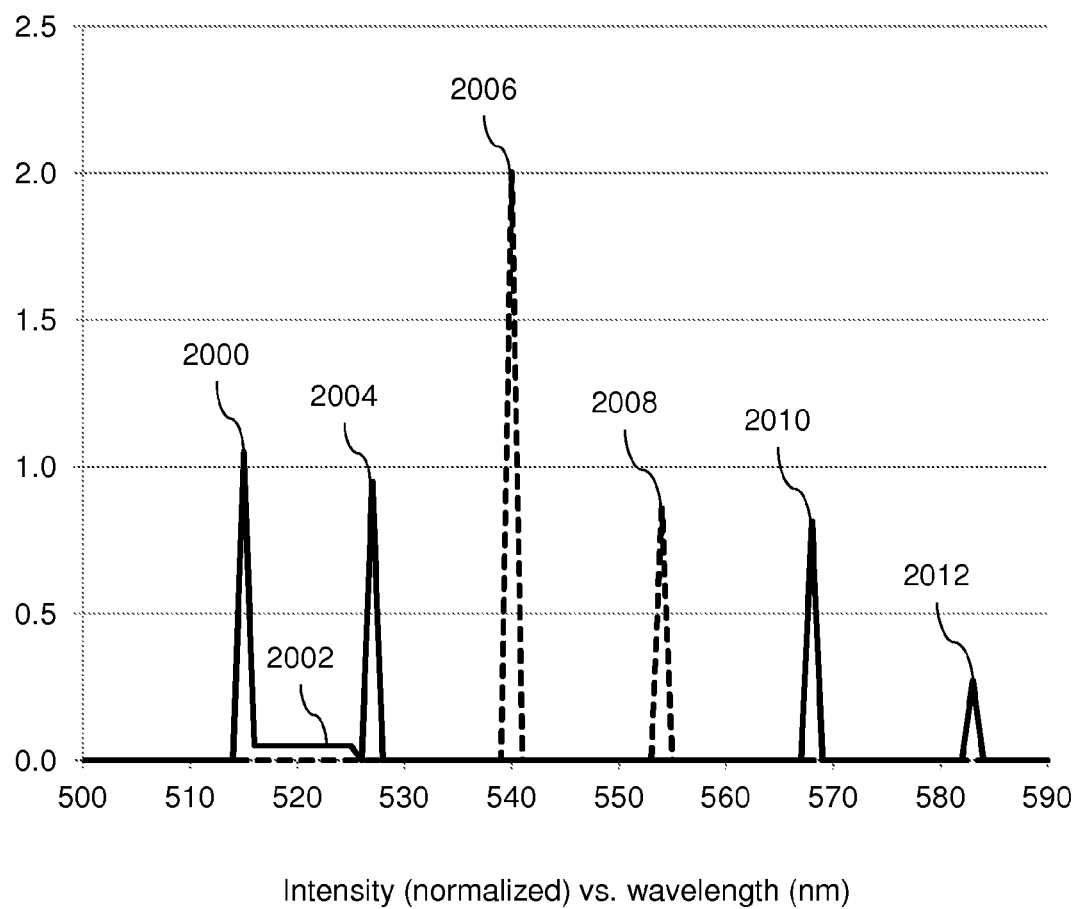
FIG. 20 is a graph of intensity vs. wavelength for a stereoscopic projection system that uses two pulsed green lasers and a laser diode assembly.

FIG. 20 shows a graph of intensity vs. wavelength for a stereoscopic projection system that uses two pulsed green lasers and a laser diode assembly. The horizontal axis represents wavelength in nanometers and the vertical axis represents normalized light intensity. As a starting point, the spectrum shown is FIG. 17 is used except that the spectrum is shifted slightly so that the starting wavelength is 515 nm rather than 518 nm. Only the green portion of the spectrum is shown in FIG. 20. First peak 2000 is the starting peak from a pulsed laser as shown in FIG. 17. Second peak 2002, is a broad region of light from green laser diodes in the range of 515 to 525 nm. Third peak 2004, fourth peak 2006, fifth peak 2008, and sixth peak 2010, and seventh peak 2012 are SRS-shifted peaks generated in an optical fiber as in FIG. 17. Fourth peak 2006 also includes a second pulsed green laser at 540 nm. A solid line is shown for first peak 2000, second peak 2002, and sixth peak 2010, and seventh peak 2012 indicating that those peaks form the first green primary of a stereoscopic image. A dashed line is shown for fourth peak 2006, and fifth peak 2008 indicating that those peaks form the second green primary of the same stereoscopic image. Seventh peak 2012 is shown reduced by projector transmission at the long edge of the green band. In this example, if the intensity of the first green peak from the pulsed laser is normalized to 1, the intensity of the green laser diodes is 0.05, and the intensity of the second pulsed green laser is 1.1.

Figure 21:
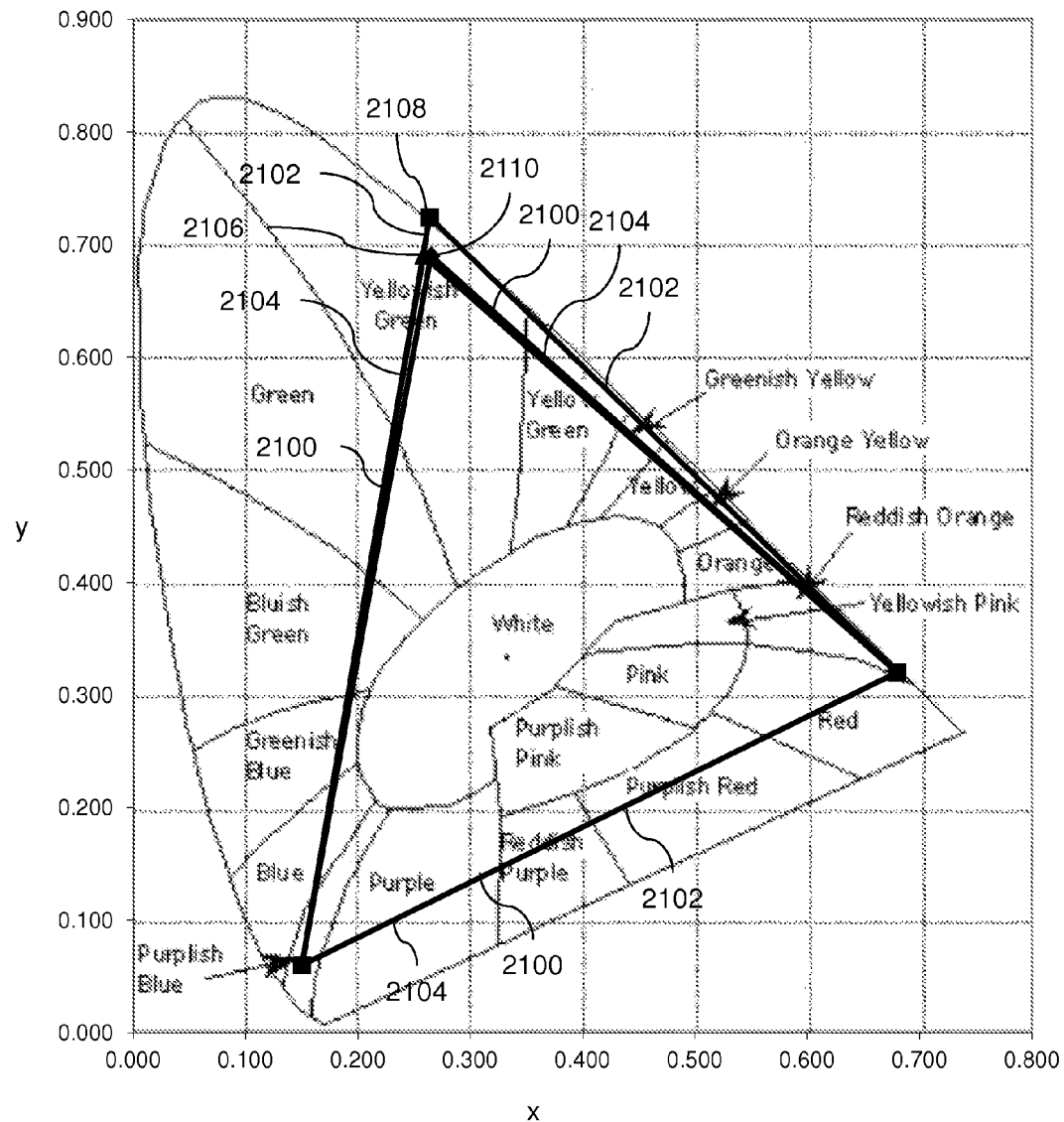
FIG. 21 is a color chart of a color gamut from a stereoscopic projection system that uses two pulsed green lasers and a laser diode assembly.

FIG. 21 shows a color chart of a color gamut from a stereoscopic projection system that uses two pulsed green lasers and a laser diode assembly. The x and y axes represent the x and y coordinates of the CIE 1931 color space. First triangle 2100 shows a color gamut with blue and red primary colors at the DCI standard, and a green primary at first point 2106 corresponding to the first green primary in FIG. 20. Second triangle 2102 shows a color gamut with blue and red primary colors at the DCI standard, and a green primary at second point 2108 corresponding to the second green primary in FIG. 20. Third triangle 2104 shows the color gamut of the DCI standard with a green primary at third point 2110. First triangle 2100 and second triangle 2102 each include the entire region of third triangle 2104 which shows that both images of the stereoscopic image can meet the color requirements of the DCI standard. In actuality, two different red primaries (not shown in FIG. 21) and two different blue primaries (not shown in FIG. 21) would be used for stereoscopic projection.

Figure 22:
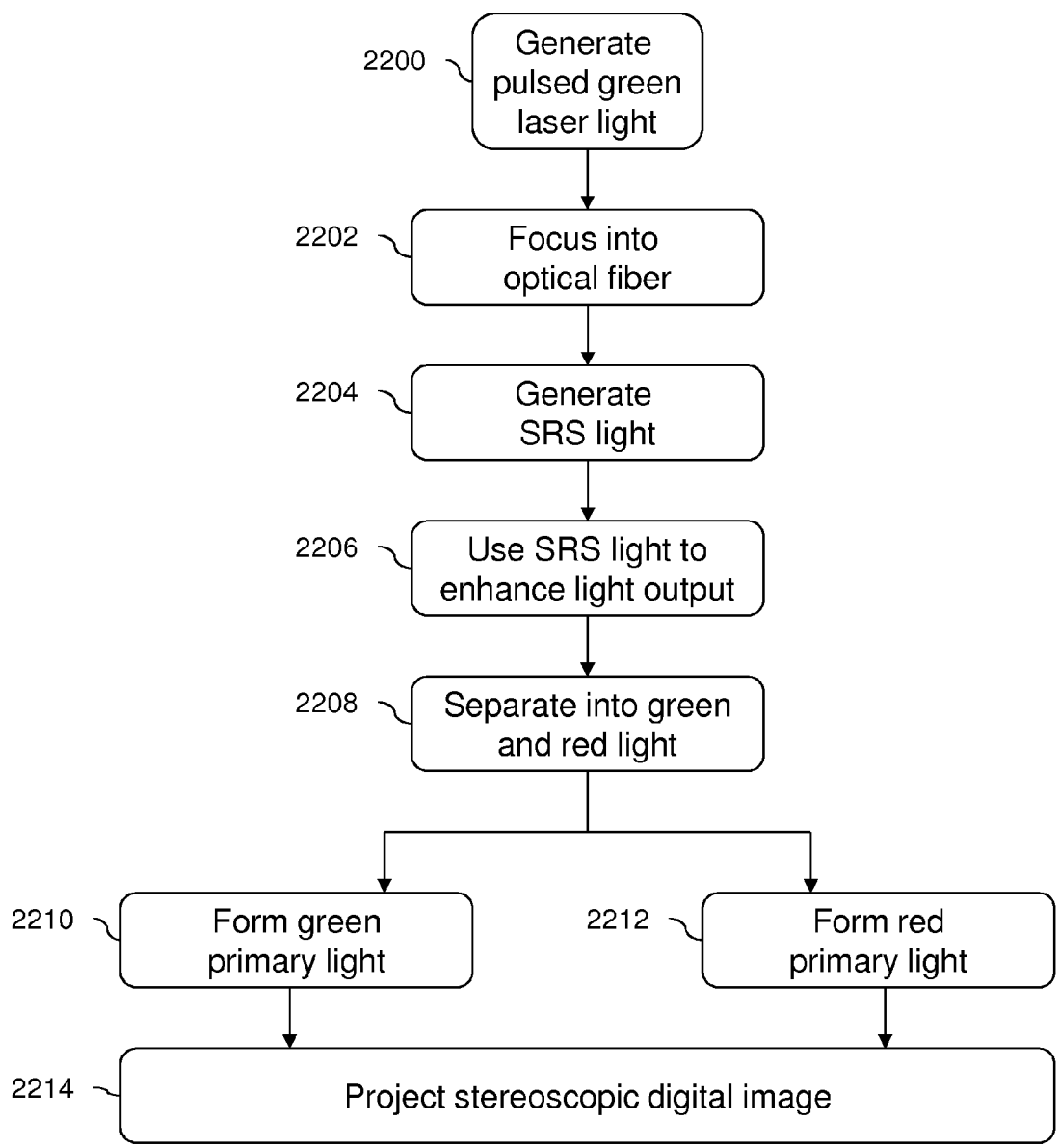
FIG. 22 is a flowchart of a stereoscopic projection method that uses a pulsed green laser and optical fiber that generate green light and red light.

FIG. 22 shows a flowchart of a stereoscopic projection method that uses a pulsed green laser and optical fiber that generate green light and red light. In step 2200, pulsed green laser light is generated. In step 2202, the laser light is focused into an optical fiber. In step 2204, SRS light is generated in the optical fiber. In step 2206, the SRS light is used to enhance the light output, for example reducing speckle or changing color. In step 2208, the light is separated into green and red light. In step 2210, the green light is used to form a green primary. In step 2212, the red light is used to form a red primary. In step 2214, the green and red primaries are used to project a color-separated stereoscopic digital image.

Figure 23:
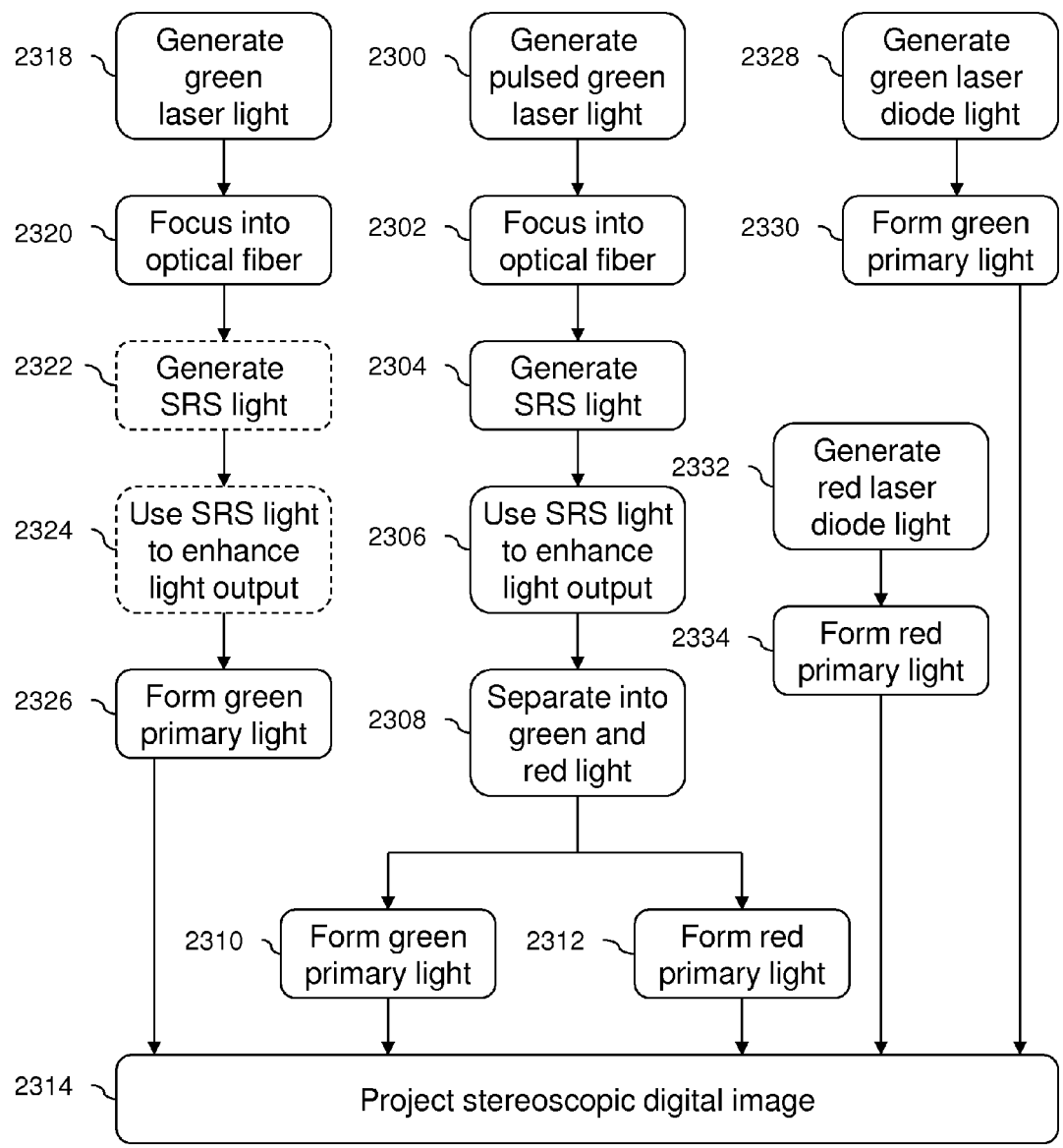
FIG. 23 is a flowchart of a stereoscopic projection method that uses two pulsed green lasers, a green laser diode assembly, and a red laser diode assembly.

FIG. 23 shows a flowchart of a stereoscopic projection method that uses two pulsed green lasers, a green laser diode assembly, and a red laser diode assembly. In step 2300, pulsed green laser light is generated. In step 2302, the laser light is focused into an optical fiber. In step 2304, SRS light is generated in the optical fiber. In step 2306, the SRS light is used to enhance the light output, for example reducing speckle or changing color. In step 2308, the light is separated into green and red light. In step 2310, the green light is used to form a green primary. In step 2312, the red light is used to form a red primary. In step 2314, the green and red primaries combine and are used to project a color-separated stereoscopic digital image. In step 2318, green laser light is generated. In step 2320, the green laser light is focused into an optical fiber. In step 2322, SRS light is optionally generated in the optical fiber. In step 2324, the SRS light is optionally used to enhance the light output, for example reducing speckle or changing color. In step 2326, the green light is used to form a green primary. In step 2314, the light from step 2326 combines with light from steps 2310 and 2312 to project a color-separated stereoscopic digital image. In step 2328, light from green laser diodes is generated. In step 2330, the green light is used to form a green primary. In step 2314, the light from step 2330 combines with light from steps 2326, 2310 and 2312 to project a color-separated stereoscopic digital image. In step 2332, light from red laser diodes is generated. In step 2334, the red light is used to form a red primary. In step 2314, the light from step 2334 combines with light from steps 2330, 2326, 2310 and 2312 to project a color-separated stereoscopic digital image. The green laser light generated in step 2318 may be pulsed or continuous wave.

Laser diode assemblies may consist of one or more individual semiconductor laser diode single emitters or bars with multiple emitters per bar. The assemblies may include aggregation optics such as lenses, mirrors, filters, beamsplitters, and optical fibers. Continuous wave (CW) operation or quasi-continuous wave (QCW) operation is most common. Green laser diodes are commercially available within the range of 510 to 540 nm (with the highest power in the range of 510 to 525 nm), so this range is practical and also provides some despeckling from wavelength diversity. Conventional high-power red laser diodes are available at wavelengths from infrared down to approximately 636 nm. Pulsed or CW green fiber lasers based on Ytterbium-doped optical fibers are commercially available in the range of approximately 510 nm to 540 nm. Green fiber lasers are generally constructed from infrared fiber lasers that have non-linear doubling crystals to produce green light.

In order to drive the Raman effect to the point where significant red light is generated and the risk of fiber damage is minimized, it may be advantageous to use short laser pulses in the range of 0.1 to 10 ns. These short pulses may be generated by a MOPA fiber laser system or mode-locked laser which may be constructed from various combinations of optical oscillators and one or more stages of optical amplification. If the optical oscillator has a short cavity on the order of millimeters or less, the oscillator is capable of generating short pulses. MOPA fiber laser systems may be constructed with a short-pulse master oscillator formed from a microchip laser or a pulsed laser diode. One, two, or more stages of amplification may be added with doped-fiber lengths that are pumped by additional laser diodes coupled with additional optical fibers.

In the above examples, two projectors have been shown for stereoscopic projection. One projector may be used instead with appropriate time-sequential filtering or other techniques to direct the proper color to each eye for stereoscopic imaging.

In order to efficiently project color-separated stereoscopic images and limit ghosting between the eyes, the bands for each eye should be separated by at least 13 nm in the green and at least 15 nm in the red. This allows the 3D filter glasses to separate the images between the eyes without wasting light and without leakage from the opposite eye. In the case of more than one pulsed laser, the starting wavelength and resultant SRS-shifted wavelengths may be selected so that the peaks match and therefore maintain the separation between all the peaks. The shortwave red primary may be generated from SRS-shifted red light with the optional addition of red laser diodes at approximately 638 nm. This wavelength region then falls between approximately 600 nm to 640 nm. In order to provide sufficient separation between the eyes and avoid very low luminous efficacy, the longwave red region then falls approximately in the range of 650 nm to 680.

Laser despeckling is accomplished by the wavelength diversity of including many wavelength peaks, the broadening of SRS-shifted peaks (not shown FIGS. 17, 18 and 20, and in some cases, the utilization of a broad band of green laser diodes (shown in FIG. 20). Color-separated 3D projection can be accomplished with a low-gain or moderate-gain white screen which inherently shows less speckle than the high-gain polarization-preserving silver screens that are typically used for polarized 3D.

Stabilization of the brightness and color for each eye may be implemented with feedback systems based on laser power output or color and may control the output of a green laser diode assembly for one eye, and the output of a second green pulsed laser for the other eye.

Other implementations are also within the scope of the following claims.

What is claimed is:

1. An optical apparatus comprising:
a pulsed laser that generates a first green light; and
an optical fiber;
wherein the first green light is focused into the optical fiber; the optical fiber generates a stimulated Raman scattering light that enhances an aspect of a light output of the optical fiber and broadens a spectrum of the first green light to produce a first red light;
the light output from the optical fiber is separated into a second green light and the first red light;
the second green light is used to form a green primary of a stereoscopic image; and
the first red light is used to form a first red primary of the stereoscopic image.

2. The apparatus of claim 1 wherein the aspect of the light output of the optical fiber is a color of the output of the optical fiber.

3. The apparatus of claim 1 wherein the aspect of the light output of the optical fiber is a speckle characteristic of the output of the optical fiber.

4. The apparatus of claim 1 further comprising: a red laser diode assembly that generates a second red light; wherein the second red light forms a second red primary of the stereoscopic image.

5. The apparatus of claim 4 wherein the second red light has a wavelength between 650 and 680 nm.

6. The apparatus of claim 1 wherein the first green light has a wavelength between 510 and 540 nm.

7. The apparatus of claim 1 wherein the pulsed laser comprises a master-oscillator power-amplifier fiber-laser system.

8. The apparatus of claim 1 further comprising: a green laser that generates a third green light.

9. The apparatus of claim 8 wherein the third green light has a wavelength between 510 and 540 nm.

10. The apparatus of claim 8 wherein the third green light has a wavelength that matches a wavelength of the stimulated Raman scattering light.

11. The apparatus of claim 1 further comprising: a green laser diode assembly that generates a fourth green light; wherein the fourth green light is used to form the green primary of the stereoscopic image.

12. The apparatus of claim 11 wherein the fourth green light has a wavelength between 510 and 540 nm.

13. An image projection method comprising: generating a first green light from a pulsed laser;
focusing the first green light into an optical fiber;
generating a stimulated Raman scattering light that enhances an aspect of a light output from the optical fiber and broadens a spectrum of the first green light to produce a first red light;
separating the light output from the optical fiber into a second green light and the first red light;
using the second green light to form a green primary of a stereoscopic image; and using the first red light to form a first red primary of the stereoscopic image.

14. The method of claim 13 wherein the aspect of the light output of the optical fiber is a color of the output of the optical fiber.

15. The method of claim 13 wherein the aspect of the light output of the optical fiber is a speckle characteristic of the output of the optical fiber.

16. The method of claim 13 further comprising: generating a second red light from a red laser diode; and using the second red light to form a second red primary of the stereoscopic image.

17. The method of claim 16 wherein the second red light has a wavelength between 650 and 680 nm.

18. The method of claim 13 wherein the first green light has a wavelength between 510 and 540 nm.

19. The method of claim 13 wherein the pulsed laser comprises a master-oscillator power-amplifier fiber-laser system.

20. The method of claim 13 further comprising: generating a third green light from a green laser.

21. The method of claim 20 wherein the third green light has a wavelength between 510 and 540 nm.

22. The apparatus of claim 20 wherein the third green light has a wavelength that matches a wavelength of the stimulated Raman scattering light.

23. The method of claim 13 further comprising: generating a fourth green light from a green laser diode assembly; wherein the fourth green light is used to form the green primary of the stereoscopic image.

24. The method of claim 23 wherein the fourth green light has a wavelength between 510 and 540 nm.

* * * * *